(12) United States Patent
Murayama et al.

(10) Patent No.: US 6,477,560 B1
(45) Date of Patent: Nov. 5, 2002

(54) METHOD AND APPARATUS FOR CONTROLLING RESOURCE

(75) Inventors: Hideki Murayama, Kunitachi (JP); Hiroshi Yashiro, Kawasaki (JP); Takehisa Hayashi, Sagamihara (JP); Masahiro Kitano, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/192,218

(22) Filed: Nov. 16, 1998

(30) Foreign Application Priority Data

Nov. 17, 1997 (JP) .............................................. 9-315209

(51) Int. Cl.<sup>7</sup> ................................................ G06F 9/00
(52) U.S. Cl. ...................... 709/104; 711/147; 711/148; 709/214; 709/213; 709/216
(58) Field of Search ................................. 709/100, 104, 709/214, 216, 213, 236, 245; 711/148, 147, 154; 710/27

(56) References Cited

U.S. PATENT DOCUMENTS 5,251,317 A * 10/1993 Iizuka et al. ................ 709/104
5,625,795 A * 4/1997 Sakakura et al. ........... 711/148

* cited by examiner

Primary Examiner—Majid Banankhah
(74) Attorney, Agent, or Firm—Antonelli, Terry, Stout & Kraus, LLP

(57) ABSTRACT

A control method of controlling a computer for controlling a resource connected to the computer and shared by a plurality of programs included in the computer includes the steps of storing a control information ID indicating a storage area in the main memory storing control information concerning access between a certain program and the resource in an OS space of a main memory, storing the control information ID in an adaptor connected to the main memory via a bus, and taking out the control information from the storage area included in the OS space, by using the control information ID stored in the adapter. In the case where the adapter runs short of a storage area, information that the adapter runs short of a storage area in the main memory is conveyed via the bus. By using the control information thus taken out, the resource is controlled.

18 Claims, 15 Drawing Sheets

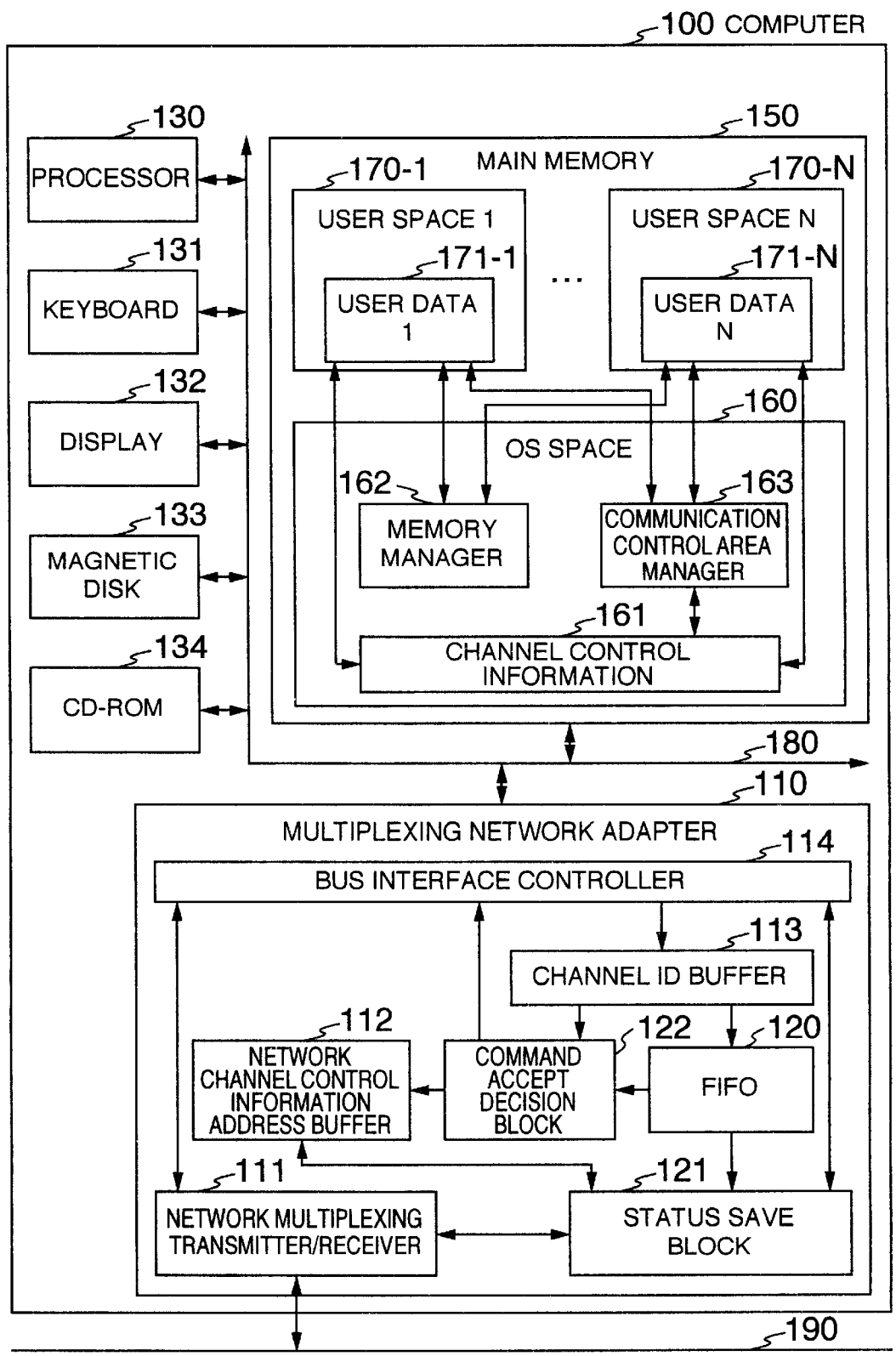

FIG.2A

| | CONTROL INFORMATION FOR COMMUNICATION CHANNEL ID=1 | | CONTROL INFORMATION FOR COMMUNICATION CHANNEL ID=0 | |
|---|---|---|---|---|
| 210-1 | COMMAND ACCEPTANCE STATUS | ... | COMMAND ACCEPTANCE STATUS | 210-N |
| 220-1 | DMA START ADDRESS | ... | DMA START ADDRESS | 220-N |
| 230-1 | DMA LENGTH | ... | DMA LENGTH | 230-N |
| 240-1 | HEADER INFORMATION | ... | HEADER INFORMATION | 240-N |
| 250-1 | COMMAND | ... | COMMAND | 250-N |
| 260-1 | STATUS | ... | STATUS | 260-N |

FIG.2B

| 270 | UTILIZATION STATUS OF COMMUNICATION CHANNEL ID=1 | UTILIZATION STATUS OF COMMUNICATION CHANNEL ID=2 | | UTILIZATION STATUS OF COMMUNICATION CHANNEL ID=N |
|---|---|---|---|---|

FIG.3

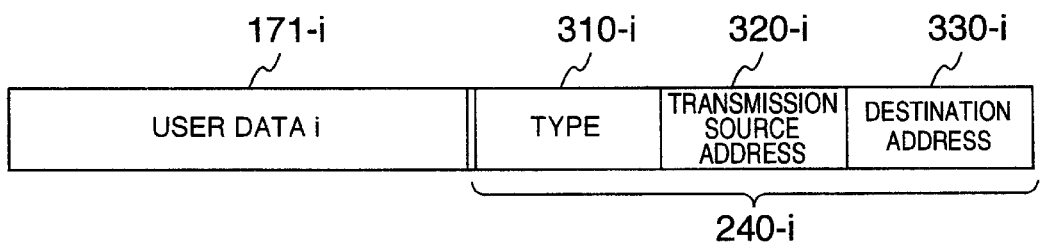

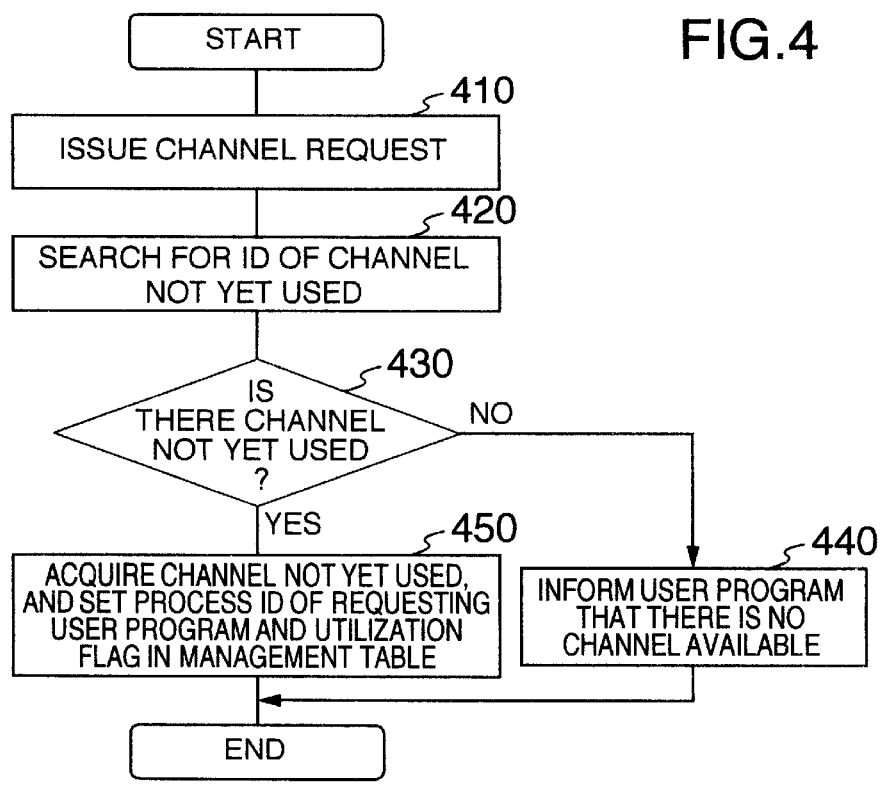
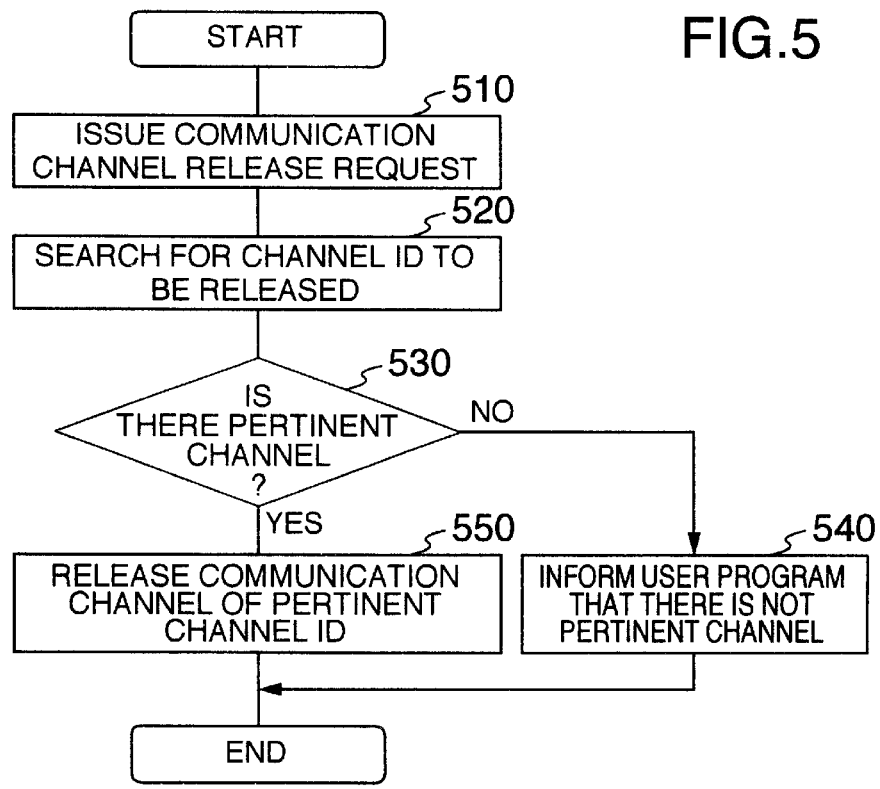

FIG.10A

| | CONTROL INFORMATION FOR COMMUNICATION | | CONTROL INFORMATION FOR COMMUNICATION | |
|---|---|---|---|---|
| 1010-1 | | | | 1010-N |
| 1020-1 | COMMAND ACCEPTANCE STATUS | ... | COMMAND ACCEPTANCE STATUS | 1020-N |
| 1030-1 | DMA START ADDRESS | ... | DMA START ADDRESS | 1030-N |
| 1040-1 | DMA LENGTH | ... | DMA LENGTH | 1040-N |
| 1050-1 | HEADER INFORMATION | ... | HEADER INFORMATION | 1050-N |
| 1060-1 | COMMAND | ... | COMMAND | 1060-N |
| | STATUS | ... | STATUS | |

FIG.10B

| 1070 | UTILIZATION STATUS OF CONTROL INFORMATION ID=1 | UTILIZATION STATUS OF CONTROL INFORMATION ID=2 | | UTILIZATION STATUS OF CONTROL INFORMATION ID=N |
|---|---|---|---|---|

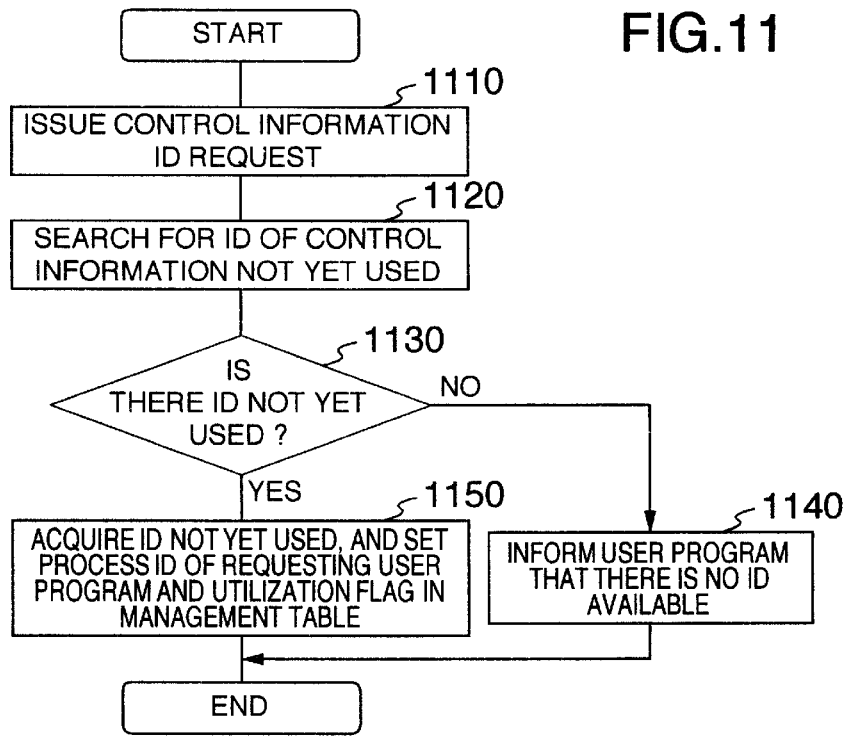

| | CONTROL INFORMATION FOR SCSI | | CONTROL INFORMATION FOR SCSI | |
|---|---|---|---|---|
| 1710-1 | | | | 1710-N |
| 1720-1 | COMMAND ACCEPTANCE STATUS | ... | COMMAND ACCEPTANCE STATUS | 1720-N |
| 1730-1 | DMA START ADDRESS | ... | DMA START ADDRESS | 1730-N |
| 1740-1 | DMA LENGTH | ... | DMA LENGTH | 1740-N |
| 1750-1 | HEADER INFORMATION | ... | HEADER INFORMATION | 1750-N |
| 1760-1 | COMMAND | ... | COMMAND | 1760-N |
| | STATUS | ... | STATUS | |

FIG.17B

| 1770 | UTILIZATION STATUS OF CONTROL INFORMATION ID=1 | UTILIZATION STATUS OF CONTROL INFORMATION ID=2 | | UTILIZATION STATUS OF CONTROL INFORMATION ID=N |
|---|---|---|---|---|

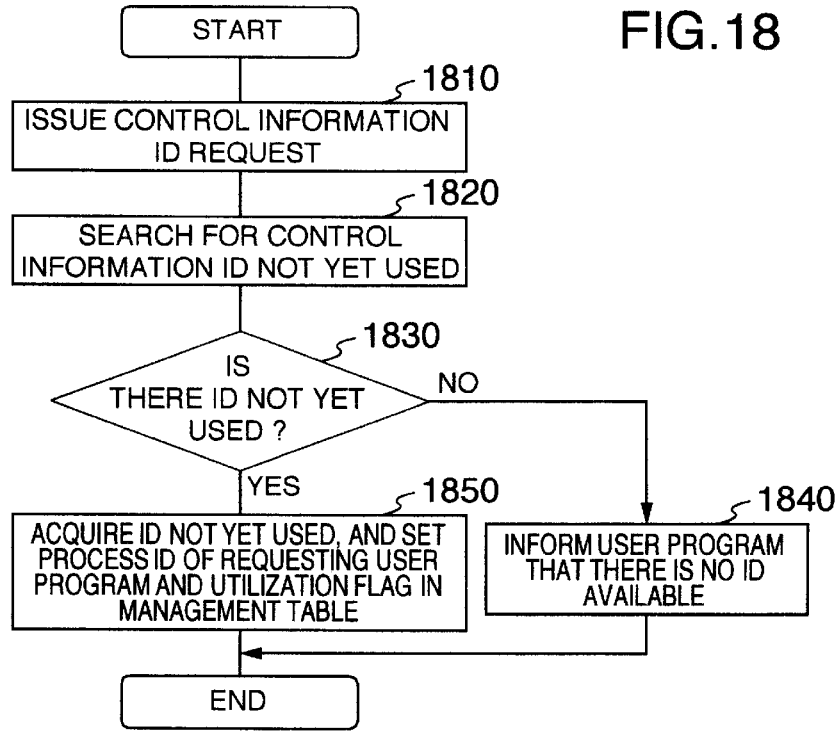

FIG.18

METHOD AND APPARATUS FOR CONTROLLING RESOURCE

CROSS REFERENCES TO RELATED APPLICATION

The present invention relates to U.S. patent application Ser. No. 09/193,852 entitled "Memory Disk Sharing Method and Its Implementing Apparatus" filed on Nov. 18, 1998, by Hiroshi Yashiro et al. and now issued as U.S. Pat. No. 6,108,694 on Aug. 22, 2000.

BACKGROUND OF THE INVENTION

The present invention relates to a computer having a control apparatus for controlling a resource shared by a plurality of programs, and in particular to a technique which is effective to a computer system and which causes a multiplexing network adapter for mutually coupling a plurality of computers to be usable from a plurality of user programs without mutual exclusion.

A loosely-coupled computer system connected to a network is disclosed in each of U.S. Pat. No. 5,617,424 entitled "Method of communication between network computers by dividing packet data into parts for transfer to respective regions", filed by H. Murayama et al., on May 3, 1996, and issued on Apr. 1, 1997, and U.S. Pat. No. 5,935,205 entitled "A computer system having a plurality of computers each controlling access to shared memory based on structural definition information", filed by Murayama et al. on Jun. 21, 1996, and issued on Aug. 10, 1999.

In a certain conventional control apparatus which accesses a resource shared by a plurality of programs, mutual exclusion must be conducted by an operating system (OS) in order to provide a consistent operation for that shared resource. The reason why the OS must provide mutual exclusion because the shared resource may be shared by a plurality of programs and each program has no knowledge each other.

Processing of context saving recovery accompanying the mutual exclusion in OS, and the fact that mutual exclusion of a network adapter by a plurality of programs causes degraded performance are described in Douglas E. COMER et al., "INTERNETWORKING WITH TCP/IP VOLUME II", 1991, pp. 7–25, S. J. Leffler et al., "The Design and Implementation of the 4.3BSD UNIX Operating System", 1989, pp. 23 and 109–137, and Steven H. Rodrigues et al., "High-Performance Local-Area Communication With Fast Sockets", January 1997.

SUMMARY OF THE INVENTION

An object of the present invention is to provide a technique allowing a plurality programs to access a resource without mutual exclusion in OS.

Another object of the present invention is to provide a common-resource control system preventing another processing request during execution of a certain processing request from a program.

According to the present invention, there is provided a control method of controlling a computer for controlling a resource connected to the computer and shared by a plurality of programs included in the computer, said control method comprising the steps of:

storing a control information ID in an OS space of a main memory, said control information ID indicating a storage area in said main memory storing control information concerning access between a certain program and said resource;

storing said control information ID in an adaptor connected to said main memory via a bus; and taking out said control information from said storage area in said main memory included in said OS space, by using said control information ID stored in said adapter. It is possible to inform via said bus, that said adapter runs short of a storage area, when said adapter runs short of a storage area.

In a resource control apparatus for controlling a resource shared by a plurality of programs according to the present invention, a processing request to a resource is issued by writing a control information ID by means of single processing, then the processing request is accepted, and the processing is conducted in the resource.

In a resource control apparatus of the present invention, control information for conducting processing with respect to a resource is first stored in a certain area in a control information area, a control information ID indicating the area storing said control information is held in a control information ID buffer by a single write transaction, and a processing request is issued.

Subsequently, it is determined whether there is a vacant area in a FIFO storing a plurality of control information IDs. If there is a vacant area in the FIFO, then the control information ID held in the control information ID buffer is stored in the FIFO, and the processing request is accepted.

Subsequently, the control information ID is taken out from the FIFO, and the control information of the area corresponding to the control information ID is acquired from the control information area. Thus the processing is conducted.

In the resource control apparatus of the present invention, a processing request to a resource is conducted by a single write transaction into the control information ID buffer as described above. While a program issues a processing request to the shared apparatus, any other processing requests do not get in. Therefore, a plurality of programs can access the resource without mutual exclusion.

In the resource control apparatus of the present invention, a processing request to a resource is accepted by a single write transaction and the processing request is executed as heretofore described. Without mutual exclusion by using the OS, therefore, a plurality of programs can access the resource.

BRIEF DESCRIPTION OF THE DRAWINGS

FIG. 1 is a diagram showing the schematic configuration of a resource control apparatus of a first embodiment;

FIGS. 2A and 2B are diagrams showing an example of a channel control information area 161 of the first embodiment;

FIG. 3 is a diagram showing a configuration example of a transfer network packet of the first embodiment;

FIG. 4 is a flow chart showing the processing procedure of channel request processing of the first embodiment;

FIG. 5 is a flow chart showing the processing procedure of channel release request processing of the first embodiment;

FIGS. 10A and 10B are diagrams showing an example of a communication control information area 961 of the second embodiment;

FIG. 11 is a flow chart showing the processing procedure of control information ID request processing of the second embodiment;

FIGS. 17A and 17B are diagrams showing an example of a SCSI control information area 1661 of a third embodiment;

FIG. 18 is a flow chart showing the processing procedure of control information ID request processing of the third embodiment;

DESCRIPTION OF THE PREFERRED EMBODIMENTS

First Embodiment

Figure 6:
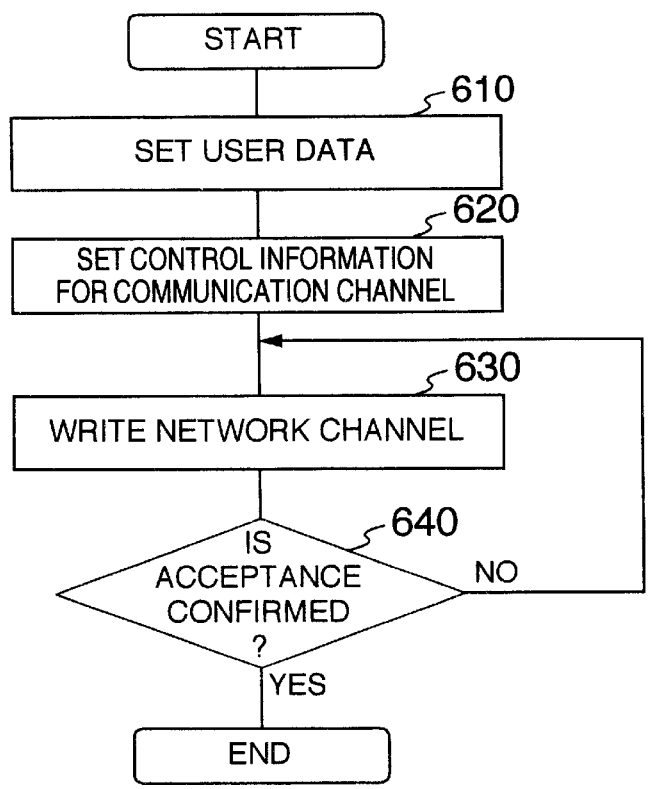
FIG. 6 is a flow chart showing the processing procedure of a transmission processing request of the first embodiment.

Hereafter, a resource control apparatus of a first embodiment which causes a multiplexing network adapter for mutually coupling a plurality of computers to be usable from a plurality of user programs without mutual exclusion will be described.

FIG. 1 is a diagram showing the schematic configuration of a resource control apparatus of the present embodiment. As shown in FIG. 1, a computer 100 of the present embodiment includes a processor 130, a main memory 150, a multiplexing network adapter 110, a keyboard 131, a display device 132, a magnetic disk device 133, a CD-ROM device 134, and a system bus 180.

The processor 130 is a processor for controlling the operation of the entire computer 100. The main memory 150 is a storage device for loading therein processing programs of a memory manager 162 and a communication control area manager 163 and data such as channel control information.

The multiplexing network adapter 110 is an adapter which accepts a transmission processing request from a plurality of user programs via the bus 180 without mutual exclusion, and which transmits and receives multiplexed user data 171 via a network 190. The keyboard 131 is a device for inputting a command such as user program start. It is also possible for a plurality of users to use the processor 130 in common. According to the number of users who input jobs, a plurality of processors may be connected to the bus 180. A plurality of accesses are serialized by the bus 180, and are processed in order.

The display device 132 is a device for displaying processing progress of a user program and so on. The magnetic disk device 133 is a device for storing various programs including processing programs of the memory manager 162, the communication control area manager 163, and so on, and storing data.

The CD-ROM device 134 is a device for reading from a CD-ROM on which various programs including processing programs of the memory manager 162, the communication control area manager 163, and so on are recorded. The system bus 180 is a bus for mutually connecting the processor 130, the main memory 150, the multiplexing network adapter 110, and so on.

The multiplexing network adapter 110 includes a network multiplexing transmitter/receiver 111, a network channel control information address buffer 112, a channel ID buffer 113, a bus interface controller 114, an accept FIFO memory 120, a status save block 121, and a command accept decision block 122.

The network multiplexing transmitter/receiver 111 is a circuit for multiplexing user data 171 supplied from a plurality of user programs, transmitting the user data 171 thus multiplexed to the network 190, and receiving multiplexed user data 171 from the network 190.

The network channel control information address buffer 112 is a register for holding an address of a specific area of a channel control information area 161 storing each channel control information so as to be associated with a network channel ID. The channel ID buffer 113 is a control information ID buffer, such as a register, for holding a network channel ID indicating a specific area in the channel control information area 161 by single writing.

The bus interface controller 114 is a controller for connecting the multiplexing network adapter 110 to the system bus 180. The accept FIFO memory 120 is an accept control information ID memory for storing a plurality of network channel IDs, and it is a memory, such as a RAM, for processing a plurality of network channel IDs in a first-in first-out (FIFO) manner.

The status save block 121 is a circuit for acquiring channel control information of a specific area corresponding to a network channel ID in the FIFO 120 from the channel control information area 161, conducting transmission processing, and writing information indicating a result of the processing into the specific area corresponding to the network channel ID in the channel control information area 161.

The command accept decision block 122 is a circuit for writing information indicating the result of acceptance of the transmission processing into a specific area corresponding to the network channel ID in the channel control information area 161 according to whether there is a vacant area in the FIFO 120, and storing the network channel ID held in the channel ID buffer 113 in the vacant area in the FIFO 120.

The main memory 150 includes an OS space 160, the channel control information area 161, the memory manager 162, the communication control area manager 163, a user space 170, and user data 171.

The OS space 160 is a space in which the OS operates. The channel control information area 161 is a control information area which stores a plurality of pieces of channel control information for conducting transmission processing in the multiplexing network adapter 110. The memory manager 162 is a manager for making the user data 171 reside on the main memory 150.

The communication control area manager 163 is a manager for returning a network channel ID of an unused area included in the channel control information area 161 in response to a communication channel request issued by a user program, and conducting assignment and release of a specific area corresponding to the network channel ID in the user space 170 of the user program of the calling side.

The user space 170 is a space for a user program to operate therein. The user data 171 is data to be transferred by a user program via the multiplexing network adapter 110.

The network 190 is a communication medium according to Ethernet (standardized by IEEE 802) or ATM (Asynchronous Transfer Mode) for connecting a plurality of computers 100.

FIG. 1 shows an example of a loosely-coupled computer system formed of a plurality of computers 100 connected by the multiplexing network adapter 110. This loosely-coupled computer system is formed by coupling at least two computers 100 to the network 190.

A computer 100 having a minimum configuration is formed by coupling the processor 130, the main memory 150, and the multiplexing network adapter 110 to the system bus 180. Numerals following the user spaces 170 and user data 171 represent integers which identify the corresponding N user programs.

The multiplexing network adapter 110 can accept transmission processing requests from a plurality of user programs without effecting the exclusive control. In order to implement this, a main body of the channel control information required to conduct transmission is placed in the channel control information area 161 on the main memory 150.

Each user program issues single writing having a network channel ID which indicates a specific area included in the channel control information area 161, and confirms the success or failure of a transmission processing request by means of writing of accept situation corresponding to this network channel ID into the main memory 150 conducted by the multiplexing network adapter 110.

Writing of a network channel ID from a user program into the multiplexing network adapter 110 is short enough to be conducted by single writing operation. Therefore, writing from a single user program into the multiplexing network adapter 110 of one time is completed. Thus, mutual exclusion among a plurality of user programs becomes unnecessary.

In the multiplexing network adapter 110, the network multiplexing transmitter/receiver 111 for conducting communication, the network channel control information address buffer 112, the channel ID buffer 113, the FIFO 120, the status save block 121, and the command accept decision block 122 are connected to the system bus 180 via the bus interface controller 114.

In the resource control apparatus of the present embodiment, the multiplexing network adapter 110 has such a configuration that the multiplexing network adapter 110 has the network multiplexing transmitter/receiver 111 therein. In an alternative configuration and mounting, however, a portion for multiplexing is independently connected to the system bus 180 as a multiplexing portion, the network multiplexing transmitter/receiver 111 is connected to the system bus 180 as an existing network adapter, and the user program is controlled via the multiplexing portion.

The command accept decision block 122 accepts writing for conducting a transmission processing request issued to the multiplexing network adapter 110, and determines whether it can be taken in the FIFO 120 to process it afterwards. The command accept decision block 122 writes accept status information having a value (for example, "1" if there is vacancy, and "0" if there is not vacancy) differing depending upon whether there is vacancy for holding the network channel ID in the FIFO 120 back into a specific address of the channel control information area 161 obtained from the network channel ID which is the content of the channel ID buffer 113 and the network channel control information address buffer 112. The command accept decision block 122 is a circuit formed of logics such as TTL or CMOS gates.

On the basis of the content of the network channel ID stored in the FIFO 120 and the address information held in the network channel control information address buffer 112, the status save block 121 acquires the channel control information stored on the main memory 150 by means of DMA (Direct Memory Access) processing. The status save block 121 sets the channel control information thus acquired in the network multiplexing transmitter/receiver 111, conducts transmission processing, and writes a result of the transmission processing back into the channel control information area 161 on the main memory 150. The status save block 121 is a circuit formed of logics, such as TTL or CMOS gates, and a RAM.

The data structure on the main memory 150 will now be described. The memory space is broadly divided into the OS space 160 and the user space 170. The OS typically has many service routines and structures. Here, however, only items relating to the resource control apparatus of the present embodiment will be described.

The memory manager 162 is a manager for conducting processing to ensure that a data area to be transferred by the user program will be on the main memory 150. Typically by removing the data area from the subject of page out in the virtual storage operation of the OS, the memory manager 162 makes the data area reside on the main memory 150.

By the way, the virtual storage structure is described in the aforementioned S. J. Leffler et al., "The Design and Implementation of the 4.3BSD UNIX Operating System," pp. 112–114.

In response to a communication channel request from a user program, the communication control area manager 163 assigns a number of a communication channel which is not yet used and which is stored in the channel control information area 161, and an address of an area corresponding to that communication channel to the user space 170 of the process of the calling side. As a data structure in the OS space 160, there is the channel control information area 161. Details thereof are shown in FIGS. 2A and 2B.

FIGS. 2A and 2B are diagrams showing an example of the channel control information area 161 of the present embodiment. As shown in FIGS. 2A and 2B, the channel control information area 161 of the present embodiment includes a command acceptance status 210, a DMA start address 220, a DMA length 230, header information 240, a command 250, a status 260, and a management table 270.

The acceptance status 210 is information indicating a result of acceptance of the transmission processing requested by a user program and conducted in the multiplexing network adapter 110. The DMA start address 220 is a start address of the user data 171 to be transmitted by the DMA processing, and it is an address set in the network multiplexing transmitter/receiver 111 by the status save block 121.

The DMA length 230 is information indicating the data length to be subject to the DMA processing. The header information 240 is information of a header of a network packet for transmitting the user data 171. The command 250 is information indicating the processing content such as continuous execution of a plurality of transmission processes.

The status 260 is status information indicating a result of transmission processing requested by a user program and conducted in the multiplexing network adapter 110. The management table 270 is a table indicating the utilization status of areas of the channel control information area 161.

The channel control information area 161 is formed of a table ranging from the acceptance status 210 to the status 260 functioning as a control block for conducting writing when a user program effects the communication control, and the management table 270 for managing them. By the way, numerals attached to the acceptance status 210 to the status 260 in FIGS. 2A and 2B represent integers for identifying N corresponding communication channels.

The management table 270 existing independently of the control block ranging from the acceptance status 210 to the status 260 is a resource managed by the OS, and indicates the utilization situation of communication channels. The management table 270 is a table updated by the OS. Resources other than the management table 270 are not shared among the user programs. Once the resources other than the management table 270 are assigned to the user programs, therefore, no mutual exclusion is required.

The user space 170 is divided for respective user programs. An area storing the user data 171 to be transferred is set so as to reside on the main memory 150 via the memory manager 162 of the OS before DMA transfer.

Furthermore, when calling the communication control area manager 163, a specific area of the channel control information area 161 is assigned to the space of the user program of the calling side. This assignment can be implemented by using a virtual memory.

By referring to FIG. 3, correspondence between a aft network packet for transferring the user data 171 and the memory structure on the main memory 150 will now be described.

FIG. 3 is a diagram showing an example of the configuration of a transfer network packet of the present embodiment. As shown in FIG. 3, header information 240 of a transfer network packet includes type 310, a transmission source address 320, and a destination address 330.

The type 310 is information indicating the class of the network packet. The transmission source address 320 is an address indicating a transmission source. The destination address 330 is an address specifying a destination area.

As shown in FIG. 3, the network packet is formed of user data 171 and header information 240 on the main memory 150. By the way, characters "i" added to the user data 171 and the header information 240 represent integers identifying N corresponding user programs and communication channels.

Hereafter, the flow of processing of requesting a communication channel when a user program conducts communication by using the multiplexing network adapter 110 will be described by referring to FIG. 4.

FIG. 4 is a flow chart showing a processing procedure of channel request processing of the present embodiment. First of all, at step 410, a certain user program in the user space issues a channel request to the communication control area manager 163 of the OS.

Then at step 420, the communication control area manager 163 searches the management table 270 (FIG. 2B) of the channel control information area 161 for a communication channel not yet used.

At step 430, the result of the search is examined. If there is a communication channel not yet used in the management table 270 of the channel control information area 161, then the processing proceeds to step 450. At step 450, the communication control area manager 163 determines the ID of one of a plurality of time-shared channels obtained from the channel not yet used, and returns the ID to the user program which has issued the channel request, and assigns a specific area corresponding to the ID of the channel to the user space 170 of the above described user program. At that time, the communication control area manager 163 sets the process ID of the user program and information indicating that the communication channel is in use in the management table 270.

If at step 430 there is no communication channel not yet used as a result of examining the result of the search, the communication control area manager 163 proceeds to step 440 and informs the user program that there is no communication channel.

Hereafter, the flow of processing conducted when a user program has requested release of a communication channel after the user program conducted communication via the multiplexing network adapter 110 and the communication channel will be described by referring to FIG. 5.

FIG. 5 is a flow chart showing a processing procedure of channel release request processing of the present embodiment. First of all, at step 510, the user program issues a channel release request requesting the release of a communication channel of an acquired channel ID to the communication control area manager 163 of the OS by specifying the acquired channel ID.

Then at step 520, the communication control area manager 163 searches the management table 270 of the channel control information area 161 for a table of the communication channel of the channel ID requested to be released.

At step 530, the result of the search is examined, and it is confirmed that the user program which has issued the channel release request is the user of that communication channel. This confirmation is conducted by determining whether the process ID of the user program of the calling side is equal to the process ID set in the management table 270.

If as a result of examining the search result at the step 530 the channel release request has been issued from the proper user program, then the processing proceeds to step 550. At step 550, the communication control area manager 163 releases the communication channel, and releases the pertinent area of the channel control information area 161 from the virtual space of the user program. At that time, the communication control area manager 163 deletes the process ID of the user program and the information indicating that the communication channel is in use from the management table 270.

If as a result of examining the search result at the step 530 the channel release request has not been issued from the proper user program, then the communication control area manager 163 proceeds to step 540, and informs the user program that there is no pertinent communication channel.

Hereafter, the flow of processing conducted when a user program requests the multiplexing network adapter 110 to conduct the transmission processing request of the user data 171 will be described by referring to FIG. 6.

FIG. 6 is a flow chart showing the processing procedure of the transmission processing request in the resent embodiment. First of all, at step 610, the user program makes the area storing the user data 171 to be transferred reside on the main memory 150 by using the memory manager 162 of the OS.

Subsequently at step 620, the user program conducts channel request processing to acquire a network channel from the communication control area manager 163, and writes the DMA start address 220, the DMA length 230, the header information 240, and the command 250 of the user data 171 into a specific area (FIG. 2A) corresponding to the acquired network channel ID in the channel control information area 161. The space to be subjected to these kinds of processing is assigned to the user space 170. Then, it is ensured that a user program may exclusively access the space. It is not necessary to conduct OS exclusive control for writing control information into an area assigned to the user space.

Subsequently at step 630, the user program issues a single write transaction indicating the network channel ID to the multiplexing network adapter 110. Writing indicating the network channel ID is a single write transaction. As a matter of course, therefore, ID writing caused by another user program is not inserted in this written ID. Here as well, it is not necessary to effect the exclusive control with respect to other user programs by using the OS.

With respect to this writing indicating the network channel ID, the multiplexing network adapter 110 writes the acceptance status 210 into a specific area corresponding to the network channel ID in the channel control information area 161.

Subsequently at step 640, the user program refers to the acceptance status 210 in the specific area corresponding to the network channel ID in the channel control information area 161, and determines whether the acceptance of the above described transmission processing request has succeeded.

Since the acceptance status 210 is assigned to an area within the user's space, no mutual exclusion is required for accessing to the status 210.

If as a result of confirming the acceptance status 210 at the step 640 the acceptance has succeeded, processing of the transmission processing request is finished. If the acceptance has failed, then a return to the step 630 is conducted and thereafter similar processing is repeated. Depending upon the processing procedure of the user program, however, the request processing may be conducted again after other processing has been executed without immediately repeating the request processing again.

The flow of processing of the channel ID buffer 113 and the command accept decision block 122 conducted when the multiplexing network adapter 110 has accepted the transmission processing request from the user program will now be described by referring to FIG. 7.

Figure 7:
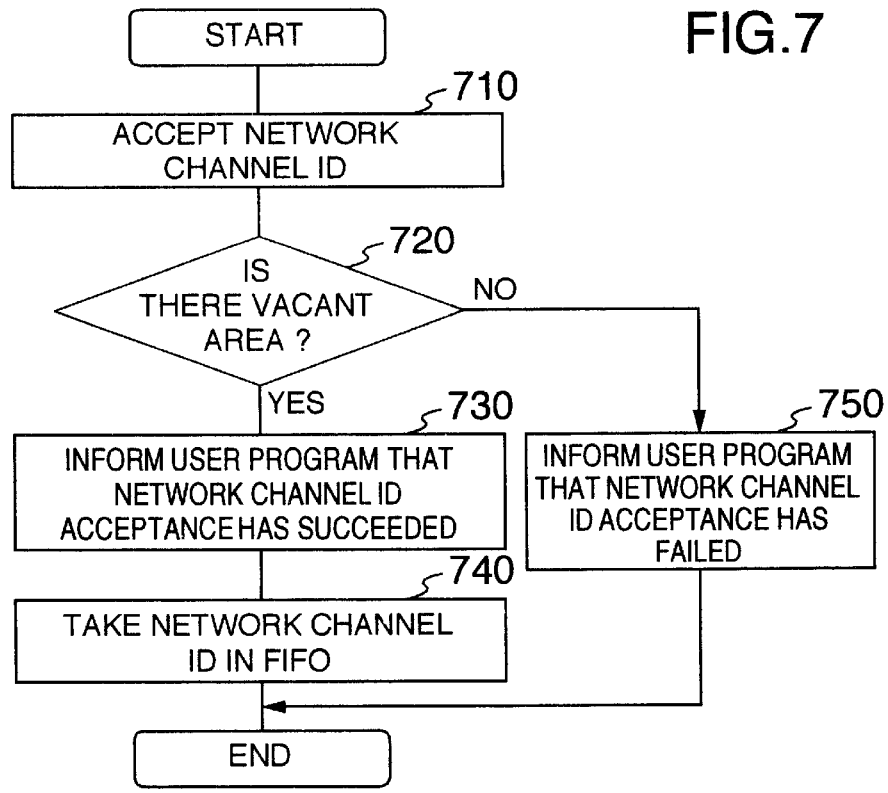
FIG. 7 is a flow chart showing the processing procedure of a command accept decision block 122 of the first embodiment.

FIG. 7 is a flow chart showing the processing procedure of the command accept decision block 122 in the present embodiment. First of all, at step 710, the multiplexing network adapter 110 receives a single write transaction indicating the network channel ID issued by the user program, in the channel ID buffer 113.

Subsequently at step 720, the command accept decision block 122 of the multiplexing network adapter 110 examines the vacancy of the FIFO 120. If there is a vacant area in the FIFO 120, the command accept decision block 122 proceeds to step 730. If there is not a vacant area, the command accept decision block 122 proceeds to step 750.

At step 730, the command accept decision block 122 reads out the address information of a specific area in the channel control information area 161 corresponding to the network channel ID held in the channel ID buffer 113 from the network channel control information address buffer 112. By using that address information, the command accept decision block 122 writes "1" into the acceptance status 210 of the channel control information corresponding to the network channel ID in the channel control information area 161 as the value of acceptance success. Then the command accept decision block 122 proceeds to step 740.

At step 740, the command accept decision block 122 accepts the network channel ID held in the channel ID buffer 113, and stores the network channel ID in a vacant area of the FIFO 120.

At step 750, the command accept decision block 122 writes "0" into the acceptance status 210 of the channel control information corresponding to the network channel ID in the channel control information area 161 as the value of acceptance failure, and finishes the processing.

The flow of processing of the status save block 121 conducted when the multiplexing network adapter 110 has accepted the transmission processing request from the user program will now be described by referring to FIG. 8.

Figure 8:
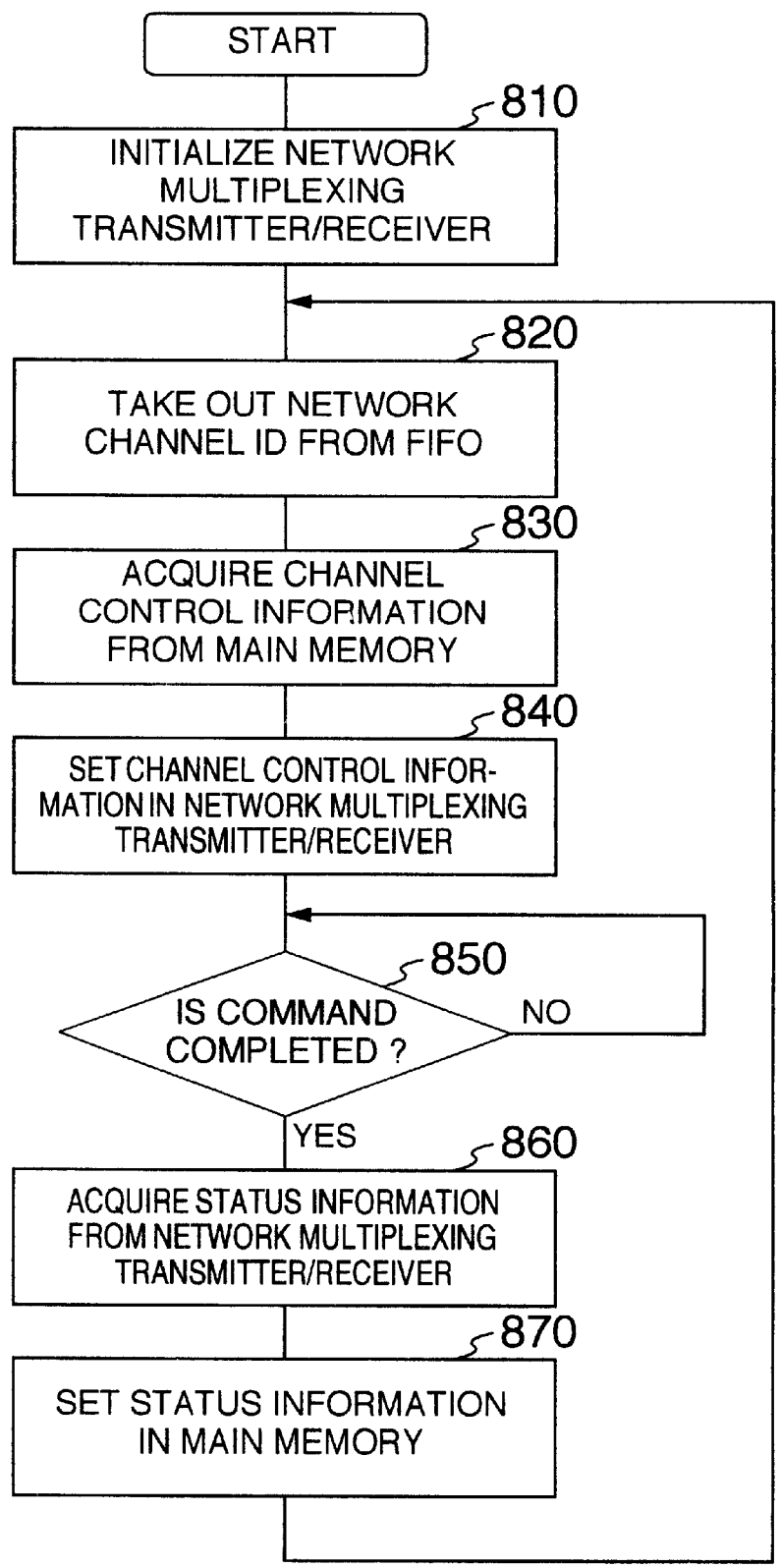
FIG. 8 is a flow chart showing the processing procedure of a status save block 121 of the first embodiment.

FIG. 8 is a flow chart showing the processing procedure of the status save block 121 in the present embodiment. First of all, at step 810, the status save block 121 initializes the network multiplexing transmitter/receiver 111. Subsequently at step 820, the status save block 121 takes out the network channel ID from the FIFO 120. If the FIFO 120 is vacant, then the status save block 121 waits until writing indicating the network channel ID is issued from the user program.

Subsequently at step 830, the status save block 121 reads out the address information of the specific area in the channel control information area 161 corresponding to the network channel ID taken out from the FIFO 120, from the network channel control information address buffer 112. By using that address information, the status save block 121 acquires channel control information corresponding to the above described network channel ID in the channel control information area 161 from the main memory 150.

The channel control information acquired here has the DMA start address 220, the DMA length 230, the header information 240, and the command 250. In order to conduct the DMA processing from a plurality of areas, however, the channel control information may have a plurality of information structures.

Subsequently at step 840, the status save block 121 sets the channel control information thus acquired in the network multiplexing transmitter/receiver 111. At step 850, the status save block 121 waits for completion of the processing.

In the step 840 and the step 850 of the resource control apparatus of the present embodiment, an example in which control is effected only once is shown. However, information for effecting a plurality of control tasks may be held as the channel control information. In that case, the status save block 121 operates while interpreting the command 250 so as to conduct a plurality of control tasks.

Subsequently at step 860, the status save block 121 acquires status information at the time of completion of the processing from the network multiplexing transmitter/receiver 111. In the case where a plurality of control tasks are conducted, it is necessary to keep each record of status information of each control.

Finally at step 870, the status save block 121 sets the above described acquired status information in the status 260 of the channel control information corresponding to the network channel ID in the channel control information area 161 of the main memory 150, and repeats the processing of the step 820 and subsequent steps.

In the resource control apparatus of the present embodiment, a processing request to a resource is accepted by a single write transaction and that processing request is executed as heretofore described. Without mutual exclusion by using the OS, therefore, it is possible to access the resource from a plurality of programs.

Second Embodiment

Hereafter, a resource control apparatus of a second embodiment which causes a network adapter for conducting communication with another computer to be usable from a plurality of user programs without mutual exclusion will be described.

Figure 9:
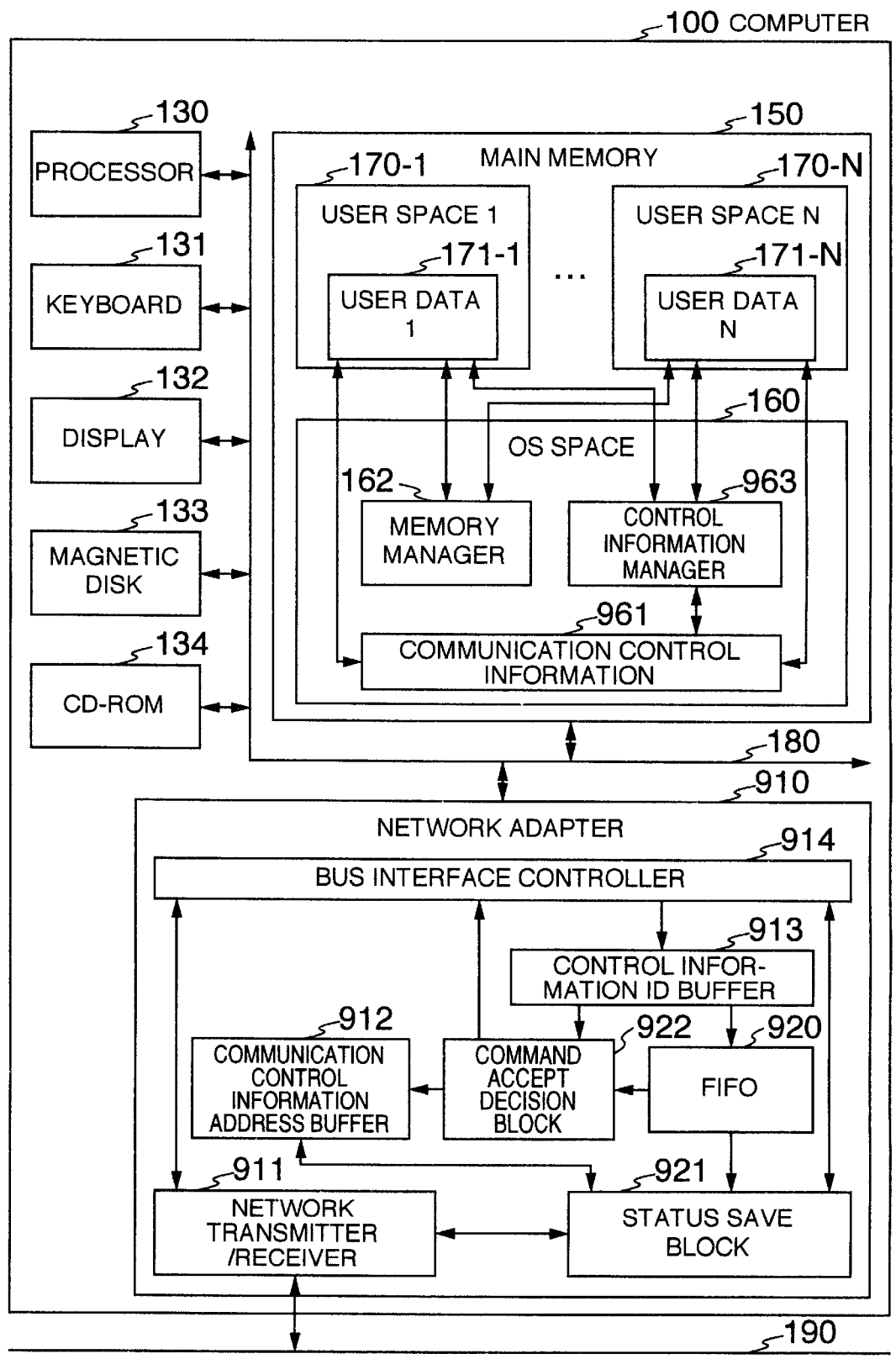
FIG. 9 is a diagram showing the schematic configuration of a resource control apparatus of a second embodiment.

FIG. 9 is a diagram showing the schematic configuration of a resource control apparatus of the present embodiment. As shown in FIG. 9, a computer 100 of the present embodiment includes a network adapter 910. The network adapter 910 is an adapter which accepts a transmission processing request from a plurality of user programs without mutual exclusion, and which transmits and receives user data 171.

The network adapter 910 includes a network transmitter/receiver 911, a communication control information address buffer 912, a control information ID buffer 913, a bus interface controller 914, a FIFO 920, a status save block 921, and a command accept decision block 922.

The network transmitter/receiver 911 is a circuit for transmitting user data 171 supplied from a plurality of user programs via the network 190, and receiving user data 171 via the network 190. The communication control information address buffer 912 is a register for holding an address of a specific area of a communication control information area 961 storing each communication control information so as to be associated with a control information ID. The control information ID buffer 913 is a buffer, such as a register, for holding a control information ID indicating a specific area in the communication control information area 961 by a single write transaction.

The bus interface controller 914 is a controller for connecting the network adapter 910 to the system bus 180. The FIFO 920 is an accept control information ID memory for storing a plurality of control information IDs, and it is a memory, such as a RAM, for processing a plurality of control information IDs in a first-in first-out manner.

The status save block 921 is a circuit for acquiring communication control information of a specific area corresponding to a control information ID in the FIFO 920 from the communication control information area 961, conducting transmission processing, and writing information indicating a result of the processing into the specific area corresponding to the control information ID in the communication control information area 961.

The command accept decision block 922 is a circuit for writing information indicating the result of accept of the transmission processing into a specific area corresponding to the control information ID in the communication control information area 961 according to whether there is a vacant area in the FIFO 920, and storing the control information ID held in the control information ID buffer 913 in the vacant area included in the FIFO 920.

The main memory 150 includes the communication control information area 961 and the control information manager 963.

The communication control information area 961 is a control information area which stores a plurality of pieces of communication control information for conducting the transmission processing in the network adapter 910. The control information manager 963 is a manager for returning a control information ID of an unused area included in the communication control information area 961 in response to a control information ID request issued by a user program, and conducting assignment and release of a specific area corresponding to the control information ID in the user space 170 of the user program of the calling side.

FIG. 9 shows an example of a computer system for conducting communication by using the network adapter 910. This loosely-coupled computer system is formed by coupling at least two computers 100 to the network 190. Each of components other than those described above has the same configuration as that of FIG. 1.

The network adapter 910 can accept transmission processing requests from a plurality of user programs without the mutual exclusion. In order to implement this, a main body of the communication control information required to conduct transmission is placed in the communication control information area 961 on the main memory 150.

Each user program issues a single write transaction having a control information ID which indicates a specific area included in the communication control information area 961, and confirms the success or failure of a transmission processing request by means of writing of accept status corresponding to this control information ID into the main memory 150 conducted by the network adapter 910.

Writing of a short control information ID from a user program into the network adapter 910 can be conducted by a single write transaction. Therefore, writing from a single user program into the network adapter 910 of one time is completed. Thus, exclusive control among a plurality of user programs becomes unnecessary.

The command accept decision block 922 accepts writing for conducting a transmission processing request issued to the network adapter 910, and determines whether it can be taken in the FIFO 920 to process it afterwards. The command accept decision block 922 writes accept status information having a value (for example, "1" if there is vacancy, and "0" if there is not vacancy) differing depending upon whether there is vacancy for holding the starting channel ID in the FIFO 920 back into a specific address of the communication control information area 961 obtained from the control information ID which is the content of the control information ID buffer 913 and the communication control information address buffer 912. The command accept decision block 922 is a circuit formed of logics such as TTL or CMOS gates.

On the basis of the content of the control information ID stored in the FIFO 920 and the address information held in the communication control information address buffer 912, the status save block 921 acquires the communication control information stored on the main memory 150 by means of DMA processing. The status save block 921 sets the communication control information thus acquired in the network transmitter/receiver 911, conducts transmission processing, and writes a result of the transmission processing back into the communication control information area 961 on the main memory 150. The status save block 921 is a circuit formed of logics, such as TTL or CMOS gates, and a RAM.

In response to a control information request from a user program, the control information manager 963 assigns a number of a control information ID which is not yet used and which is stored in the communication control information area 961, and an address of an area corresponding to that control information ID to the user space 170 of the process of the calling side. As a data structure in the OS space 160, there is the communication control information area 961. Details thereof are shown in FIGS. 10A and 10B.

FIGS. 10A and 10B are diagrams showing an example of the communication control information area 961 of the present embodiment. As shown in FIGS. 10A and 10B, the communication control information area 961 of the present embodiment includes a command acceptance status 1010, a DMA start address 1020, a DMA length 1030, header information 1040, a command 1050, a status 1060, and a management table 1070.

The acceptance status 1010 is information indicating a result of acceptance of the transmission processing requested by a user program and conducted in the network adapter 910. The DMA start address 1020 is a start address of the user data 171 transmitted by the DMA processing, and it is an address set in the network transmitter/receiver 911 by the status save block 921.

The DMA length 1030 is information indicating the data length to be subject to the DMA processing. The header information 1040 is information of a header of a network packet for transmitting the user data 171. The command 1050 is information indicating the processing content such as continuous execution of a plurality of transmission processes.

The status 1060 is status information indicating a result of transmission processing requested by a user program and conducted in the network adapter 910. The management table 1070 is a table indicating the utilization status of areas of the communication control information area 961.

The communication control information area 961 is formed of a table ranging from the acceptance status 1010 to the status 1060 functioning as a control block for conducting writing when a user program effects the communication control, and the management table 1070 for managing them. By the way, numerals attached to the acceptance status 1010 to the status 1060 in FIGS. 10A and 10B represent integers for identifying N corresponding areas.

The management table 1070 existing independently of the control block ranging from the acceptance status 1010 to the status 1060 is a resource managed by the OS, and indicates the utilization situation of control information IDs. The management table 1070 is a table updated by the OS. Resources other than the management table 1070 do not have information shared among the user programs. Once the resources other than the management table 1070 are assigned to the user programs, therefore, no mutual exclusion is required.

The user space 170 is divided for respective user programs. An area storing the user data 171 to be transferred is set so as to reside on the main memory 150 via the memory manager 162 of the OS before DMA transfer.

Furthermore, when calling the control information manager 963, a specific area of the communication control information area 961 is assigned to the space of the user program of the calling side. This assignment can be implemented by using a virtual memory.

Hereafter, the flow of processing of requesting a control information ID when a user program conducts communication by using the network adapter 910 will be described by referring to FIG. 11.

FIG. 11 is a flow chart showing a processing procedure of control information ID request processing of the present embodiment. First of all, at step 1110, a certain user program in the user space issues a control information ID request to the control information manager 963 of the OS.

Then at step 1120, the control information manager 963 searches the management table 1070 (FIG. 10B) of the communication control information area 961 for a control information ID not yet used.

At step 1130, the result of the search is examined. If there is a control information ID not yet used in the management table 1070 of the communication control information area 961, then the processing proceeds to step 1150. At step 1150, the control information manager 963 acquires the control information ID not yet used, and returns the control information ID to the user program which has issued the control information ID request, and assigns a specific area corresponding to the control information ID to the user space 170 of the above described user program. At that time, the control information manager 963 sets the process ID of the user program and information indicating that the control information ID is in use in the management table 1070.

If at step 1130 there is no communication channel ID not yet used as a result of examining the result of the search, the control information manager 963 proceeds to step 1140 and informs the user program that there is no control information ID.

Hereafter, the flow of processing conducted when a user program has requested release of a control information ID after the user program conducted communication via the network adapter 910 will be described by referring to FIG. 12.

Figure 12:
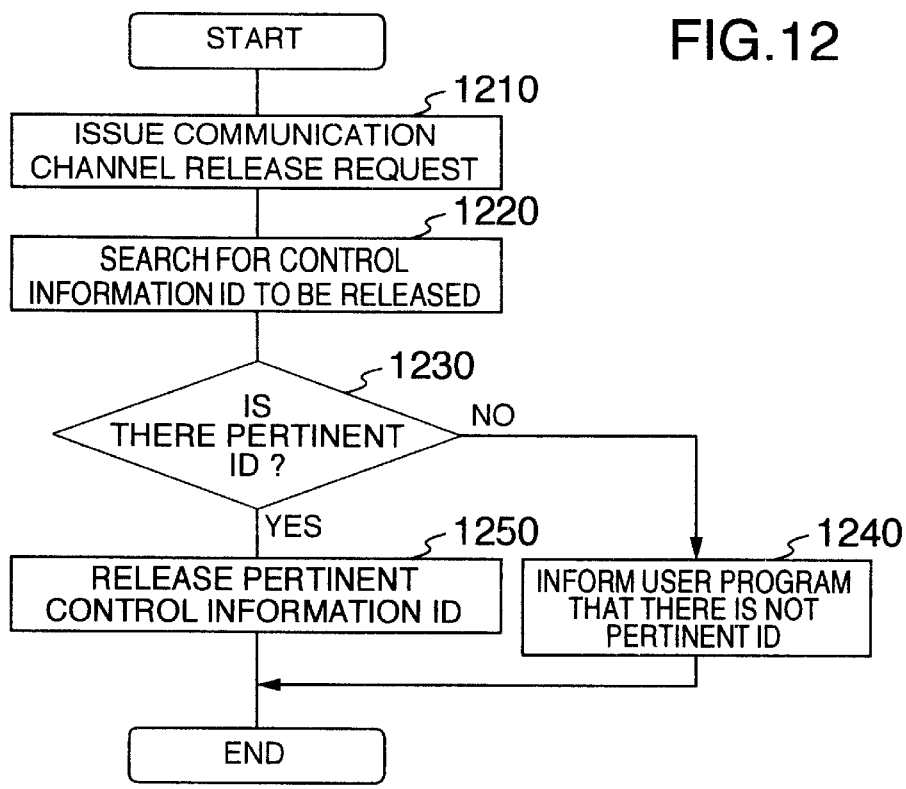
FIG. 12 is a flow chart showing the processing procedure of control information ID release request processing of the second embodiment.

FIG. 12 is a flow chart showing a processing procedure of control information ID release request processing of the present embodiment. First of all, at step 1210, the user program requests the control information manager 963 of the OS to release a control information ID by specifying the control information ID. Then at step 1220, the control information manager 963 searches the management table 1070 of the communication control information area 961 for a table of the control information ID requested to be released.

At step 1230, the result of the search is examined, and it is confirmed that the user program which has issued the control information ID release request is the user of that control information ID. This confirmation is conducted by determining whether the process ID of the user program of the calling side coincides with the process ID set in the management table 1070.

If as a result of examining the search result at the step 1230 the control information ID release request has been issued from the proper user program, then the processing proceeds to step 1250. At step 1250, the control information manager 963 releases the control information ID, and releases the pertinent area of the communication control information area 961 from the virtual space of the user program. At that time, the control information manager 963 deletes the process ID of the user program and the information indicating that the control information ID is in use from the management table 1070.

If as a result of examining the search result at the step 1230 the control information ID release request has not been issued from the proper user program, then the control information manager 963 proceeds to step 1240, and informs the user program that there is no pertinent control information ID.

Hereafter, the flow of processing conducted when a user program requests the network adapter 910 to conduct the transmission processing request of the user data 171 will be described by referring to FIG. 13.

Figure 13:
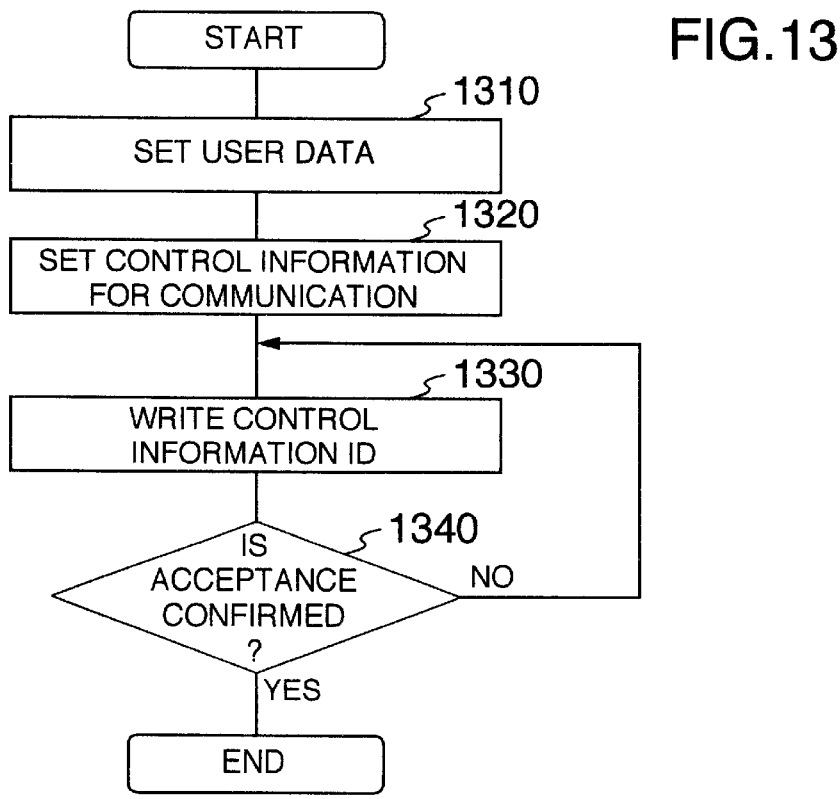
FIG. 13 is a flow chart showing the processing procedure of a transmission processing request of the second embodiment.

FIG. 13 is a flow chart showing the processing procedure of the transmission processing request in the present embodiment. First of all, at step 1310, the user program makes the area storing the user data 171 to be transferred reside on the main memory 150 by using the memory manager 162 of the OS.

Subsequently at step 1320, the user program conducts control information ID request processing to acquire a control information ID from the control information manager 963, and writes the DMA start address 1020, the DMA length 1030, the header information 1040, and the command 1050 of the user data 171 into a specific area (FIG. 10A) corresponding to the acquired control information ID in the communication control information area 961. The space to be subjected to these kinds of processing is assigned to the user space 170. It is ensured that only one user program may access that space. Therefore, no mutual exclusion is required by the OS.

Subsequently at step 1330, the user program issues single writing indicating the control information ID to the network adapter 910. The contents of this write transaction indicating the control information ID is a single write transaction. Here as well, therefore, no mutual exclusion is required with respect to other user programs by using the OS.

With respect to this write transaction indicating the control information ID, the network adapter 910 writes the acceptance status 1010 into a specific area corresponding to the control information ID in the communication control information area 961.

Subsequently at step 1340, the user program refers to the acceptance status 1010 in the specific area corresponding to the control information ID in the communication control information area 961, and determines whether the acceptance of the above described transmission processing request has succeeded.

If as a result of confirming the acceptance status 1010 at the step 1340 the acceptance has succeeded, processing of the transmission processing request is finished. If the acceptance has failed, then a return to the step 1330 is conducted and thereafter similar processing is repeated. Depending upon the processing procedure of the user program, however, the request processing may be conducted again after other processing has been executed without immediately repeating the request processing again.

The flow of processing of the control information ID buffer 913 and the command accept decision block 922 conducted when the network adapter 910 has accepted the transmission processing request from the user program will now be described by referring to FIG. 14.

Figure 14:
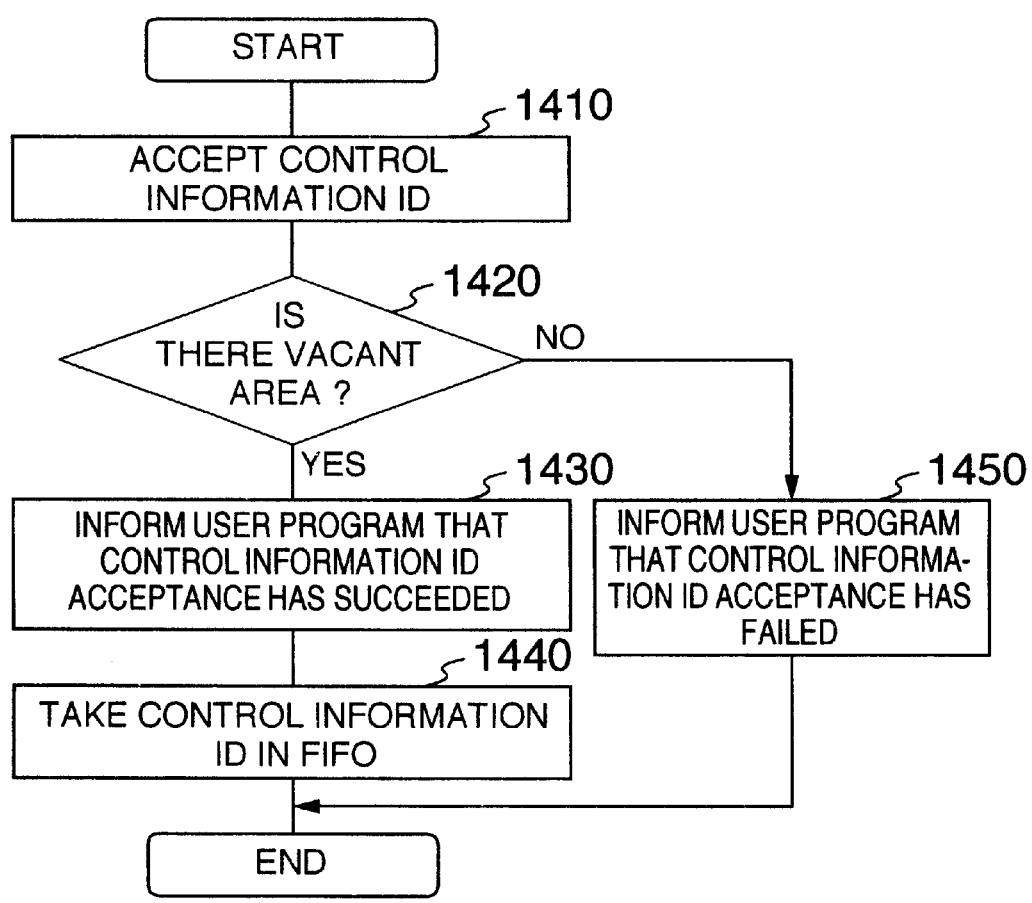
FIG. 14 is a flow chart showing the processing procedure of a command accept decision block 922 of the second embodiment.

FIG. 14 is a flow chart showing the processing procedure of the command accept decision block 922 in the present embodiment. First of all, at step 1410, the network adapter 910 receives single writing indicating the control information ID issued by the user program, in the control information ID buffer 913.

Subsequently at step 1420, the command accept decision block 922 of the network adapter 910 examines the vacancy state of the FIFO 920. If there is a vacant area in the FIFO 920, the command accept decision block 922 proceeds to step 1430. If there is not a vacant area, the command accept decision block 922 proceeds to step 1450.

At step 1430, the command accept decision block 922 reads out the address information of a specific area in the communication control information area 961 corresponding to the control information ID held in the control information ID buffer 913 from the communication control information address buffer 912. By using that address information, the command accept decision block 922 writes "1" into the acceptance status 1010 of the communication control information corresponding to the control information ID in the communication control information area 961 as the value of acceptance success. Then the command accept decision block 922 proceeds to step 1440.

At step 1440, the command accept decision block 922 accepts the control information ID held in the control information ID buffer 913, and stores the control information ID in a vacant area of the FIFO 920. At step 1450, the command accept decision block 922 writes "0" into the acceptance status 1010 of the communication control information corresponding to the control information ID in the communication control information area 961 as the value of acceptance failure, and finishes the processing.

The flow of processing of the status save block 921 conducted when the network adapter 910 has accepted the transmission processing request from the user program will now be described by referring to FIG. 15.

Figure 15:
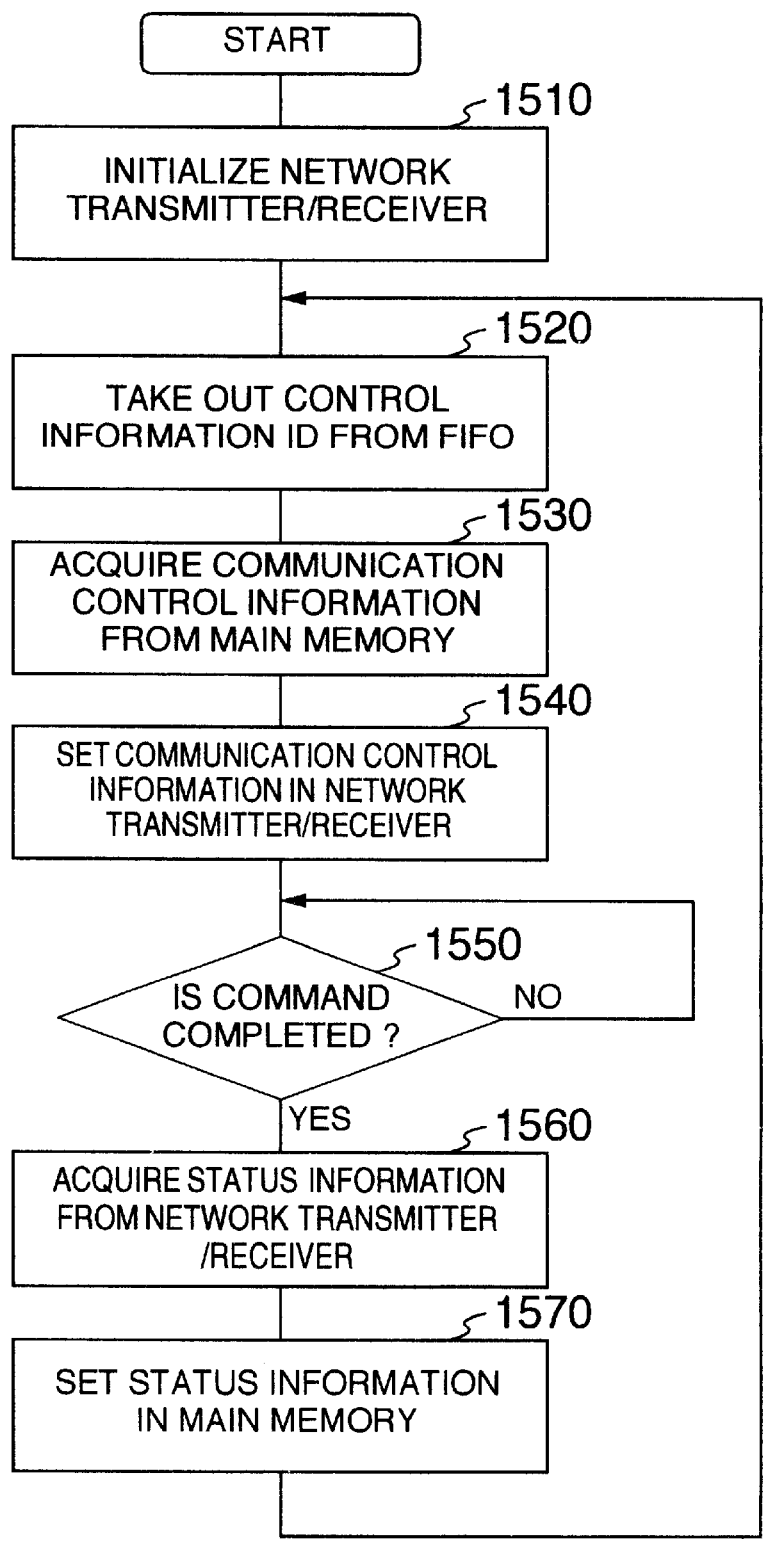
FIG. 15 is a flow chart showing the processing procedure of a status save block 921 of the second embodiment.

FIG. 15 is a flow chart showing the processing procedure of the status save block 921 in the present embodiment. First of all, at step 1510, the status save block 921 initializes the network transmitter/receiver 911. Subsequently at step 1520, the status save block 921 takes out the control information ID from the FIFO 920. If the FIFO 920 is vacant, then the status save block 921 waits until a write transaction indicating the control information ID is issued from the user program.

Subsequently at step 1530, the status save block 921 reads out the address information of the specific area in the communication control information area 961 corresponding to the control information ID taken out from the FIFO 920, from the communication control information address buffer 912. By using that address information, the status save block 921 acquires communication control information corresponding to the above described control information ID in the communication control information area 961 from the main memory 150.

By the way, the communication control information acquired here has the DMA start address 1020, the DMA length 1030, the header information 1040, and the command 1050. In order to conduct the DMA processing from a plurality of areas, however, the communication control information may have a plurality of information structures.

Subsequently at step 1540, the status save block 921 sets the communication control information thus acquired in the network transmitter/receiver 911. At step 1550, the status save block 921 waits for completion of the processing.

In the step 1540 and the step 1550 of the resource control apparatus of the present embodiment, an example in which control is effected only once is shown. However, information for effecting a plurality of control tasks may be held as the communication control information. In that case, the status save block 921 operates while interpreting the command 1050 so as to conduct a plurality of control tasks.

Subsequently at step 1560, the status save block 921 acquires status information at the time of completion of the processing from the network transmitter/receiver 911. In the case where a plurality of control tasks are conducted, it is necessary to keep each record of status information of each control.

Finally at step 1570, the status save block 921 sets the above described acquired status information in the status 1060 of the communication control information corresponding to the control information ID in the communication control information area 961 of the main memory 150, and repeats the processing of the step 1520 and subsequent steps.

In the resource control apparatus of the present embodiment, a processing request to a resource is accepted by a single write transaction and that processing request is executed as heretofore described. Without mutual exclusion in the OS, therefore, it is possible to access the resource from a plurality of programs.

Third Embodiment

Hereafter, a resource control apparatus of a third embodiment which causes a SCSI (Small Computer System Interface) adapter for conducting data transfer with an I/O device to be usable from a plurality of user programs without effecting exclusive control will be described.

Figure 16:
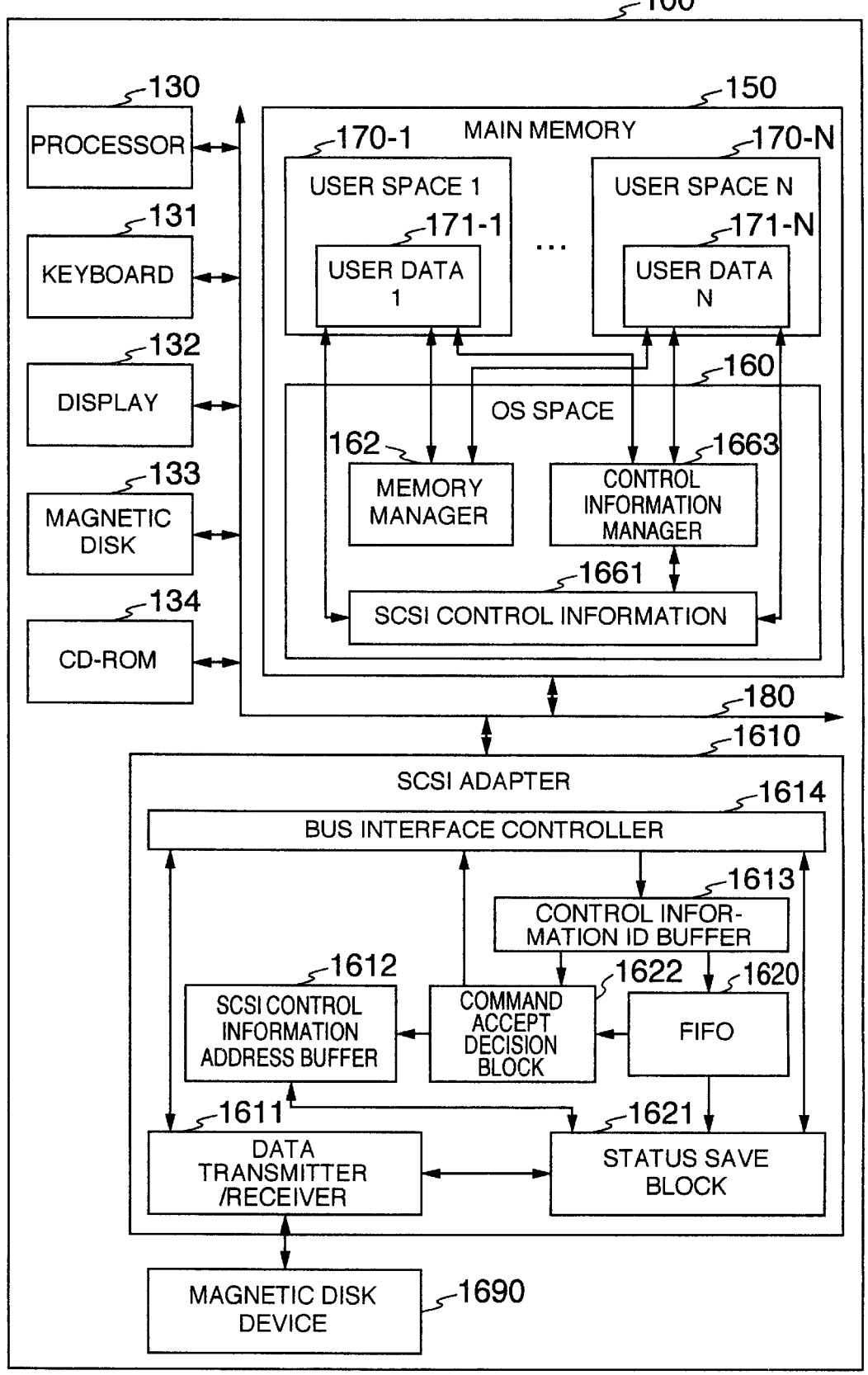
FIG. 16 is a diagram showing the schematic configuration of a resource control apparatus of a third embodiment.

FIG. 16 is a diagram showing the schematic configuration of a resource control apparatus of the present embodiment. As shown in FIG. 16, a computer 100 of the present embodiment includes a SCSI control card or adapter (hereafter referred to as SCSI adapter) 1610 and a magnetic device 1690.

The SCSI adapter 1610 is an adapter which accepts a transmission processing request from a plurality of user programs without mutual exclusion, and which transfers user data 171. The magnetic disk device 1690 is an I/O device for transferring the user data 171 between it and a plurality of user programs under the control of the SCSI adapter 1610.

The SCSI adapter 1610 includes a data transmitter/receiver 1611, a SCSI control information address buffer 1612, a control information ID buffer 1613, a bus interface controller 1614, a FIFO 1620, a status save block 1621, and a command accept decision block 1622.

The data transmitter/receiver 1611 is a circuit for transferring user data 171 supplied from a plurality of user programs to/from the magnetic disk device 1690. The SCSI control information address buffer 1612 is a register for holding an address of a specific area of a SCSI control information area 1661 storing each SCSI control information so as to be associated with a control information ID.

The control information ID buffer 1613 is a buffer, such as a register, for holding a control information ID indicating a specific area in the SCSI control information area 1661 by a single write transaction.

The bus interface controller 1614 is a controller for connecting the SCSI adapter 1610 to the system bus 180. The FIFO 1620 is an accept control information ID memory for storing a plurality of control information IDs, and it is a memory, such as a RAM, for processing a plurality of control information IDs in a first-in first-out manner.

The status save block 1621 is a circuit for acquiring SCSI control information of a specific area corresponding to a control information ID in the FIFO 1620 from the SCSI control information area 1661, conducting transfer processing, and writing information indicating a result of the processing into the specific area corresponding to the control information ID in the SCSI control information area 1661.

The command accept decision block 1622 is a circuit for writing information indicating the result of accept of the transfer processing into a specific area corresponding to the control information ID in the SCSI control information area 1661 according to whether there is a vacant area in the FIFO 1620, and storing the control information ID held in the control information ID buffer 1613 in the vacant area included in the FIFO 1620.

The main memory 150 includes the SCSI control information area 1661 and the control information manager 1663.

The SCSI control information area 1661 is a control information area which stores a plurality of pieces of SCSI control information for conducting the transfer processing in the network adapter 1610. The control information manager 1663 is a manager for returning a control information ID of an unused area included in the SCSI control information area 1661 in response to a control information ID request issued by a user program, and conducting assignment and release of a specific area corresponding to the control information ID in the user space 170 of the user program of the calling side.

FIG. 16 shows an example of a computer system for conducting communication by using the SCSI control card or adapter (hereafter referred to as SCSI adapter) 1610. Each of components other than those described above has the same configuration as that of FIG. 1.

The SCSI adapter 1610 can accept processing requests from a plurality of user programs without the mutual exclusion. In order to implement this, a main body of the SCSI control information required to conduct transfer is placed in the SCSI control information area 1661 on the main memory 150.

Each user program issues a single write transaction having a control information ID which indicates a specific area included in the SCSI control information area 1661, and confirms the success or failure of a processing request by means of writing of accept situation corresponding to this control information ID into the main memory 150 conducted by the SCSI adapter 1610.

Writing of a short control information ID from a user program into the SCSI adapter 1610 can be conducted by a single write transaction. Therefore, writing from a single user program into the SCSI adapter 1610 of one time is completed. Thus, mutual exclusion among a plurality of user programs becomes unnecessary.

The command accept decision block 1622 accepts writing for conducting a processing request issued to the SCSI adapter 1610, and determines whether it can be taken in the FIFO 1620 to process it afterwards. The command accept decision block 1622 writes accept status information 25 having a value (for example, "1" if there is vacancy, and "0" if there is not vacancy) differing depending upon whether there is vacancy for holding the control information ID in the FIFO 1620 back into a specific address of the SCSI control information area 1661 obtained from the control information ID which is the content of the control information ID buffer 1613 and the SCSI control information address buffer 1612. The command accept decision block 1622 is a circuit formed of logics such as TTL or CMOS gates.

On the basis of the content of the control information ID stored in the FIFO 1620 and the address information held in the SCSI control information address buffer 1612, the status save block 1621 acquires the SCSI control information stored on the main memory 150 by means of DMA processing. The status save block 1621 sets the SCSI control information thus acquired in the SCSI transmitter/receiver 1611, conducts transfer processing, and writes a result of the transfer processing back into the SCSI control information area 1661 on the main memory 150. The status save block 1621 is a circuit formed of logics, such as TTL or CMOS gates, and a RAM.

In response to a control information request from a user program, the control information manager 1663 assigns a number of a control information ID which is not yet used and which is stored in the SCSI control information area 1661, and an address of an area corresponding to that control information ID to the user space 170 of the process of the calling side. As a data structure in the OS space 160, there is the SCSI control information area 1661. Details thereof are shown in FIGS. 17A and 17B.

FIGS. 17A and 17B are diagrams showing an example of the SCSI control information area 1661 of the present embodiment. As shown in FIGS. 17A and 17B, the SCSI control information area 1661 of the present embodiment includes a command acceptance status 1710, a DMA start address 1720, a DMA length 1730, header information 1740, a command 1750, a status 1760, and a management table 1770.

The acceptance status 1710 is information indicating a result of acceptance of the transfer processing requested by a user program and conducted in the SCSI adapter 1610. The DMA start address 1720 is a start address of the user data 171 transferred by the DMA processing, and it is an address set in the data transmitter/receiver 1611 by the status save block 1621. The DMA length 1730 is information indicating the data length to be subject to the DMA processing. The header information 1740 is information of a header of a network packet for transferring the user data 171. The command 1750 is information indicating the processing content such as continuous execution of a plurality of transfer processes.

The status 1760 is status information indicating a result of transfer processing requested by a user program and conducted in the SCSI adapter 1610. The management table 1770 is a table indicating the utilization situation of areas of the SCSI control information area 1661.

The SCSI control information area 1661 is formed of a table ranging from the acceptance status 1710 to the status 1760 functioning as a control block for conducting writing when a user program effects the communication control, and the management table 1770 for managing them. Numerals attached to the acceptance status 1710 to the status 1760 in FIGS. 17A and 17B represent integers for identifying N corresponding areas.

The management table 1770 existing independently of the control block ranging from the acceptance status 1710 to the status 1760 is a resource managed by the OS, and indicates the utilization situation of control information IDs. The management table 1770 is a table updated by the OS. Resources other than the management table 1770 do not have information shared among the user programs. Once the resources other than the management table 1770 are assigned to the user programs, therefore, no mutual exclusion by the OS is required.

The user space 170 is divided for respective user programs. An area storing the user data 171 to be transferred is set so as to reside on the main memory 150 via the memory manager 162 of the OS before DMA transfer.

Furthermore, when calling the control information manager 1663, a specific area of the SCSI control information area 1661 is assigned to the space of the user program of the calling side. This assignment can be implemented by using a virtual memory. Hereafter, the flow of processing of requesting a control information ID when a user program conducts communication by using the SCSI adapter 1610 will be described by referring to FIG. 18.

FIG. 18 is a flow chart showing a processing procedure of control information ID request processing of the present embodiment. First of all, at step 1810, a certain user program in the user space issues a control information ID request to the control information manager 1663 of the OS.

Then at step 1820, the control information manager 1663 searches the management table 1770 (FIG. 17B) of the SCSI control information area 1661 for a control information ID not yet used.

At step 1830, the result of the search is examined. If there is a control information ID not yet used in the management table 1770 of the SCSI control information area 1661, then the processing proceeds to step 1850. At step 1850, the control information manager 1663 acquires the control information ID not yet used, and returns the control information ID to the user program which has issued the control information ID request, and assigns a specific area corresponding to the control information ID to the user space 170 of the above described user program. At that time, the control information manager 1663 sets the process ID of the user program and information indicating that the control information ID is in use in the management table 1770.

If at step 1830 there is no control information ID not yet used as a result of examining the result of the search, the control information manager 1663 proceeds to step 1840 and informs the user program that there is no control information ID.

Hereafter, the flow of processing conducted when a user program has requested release of a control information ID after the user program conducted communication via the SCSI adapter 1610 will be described by referring to FIG. 19.

Figure 19:
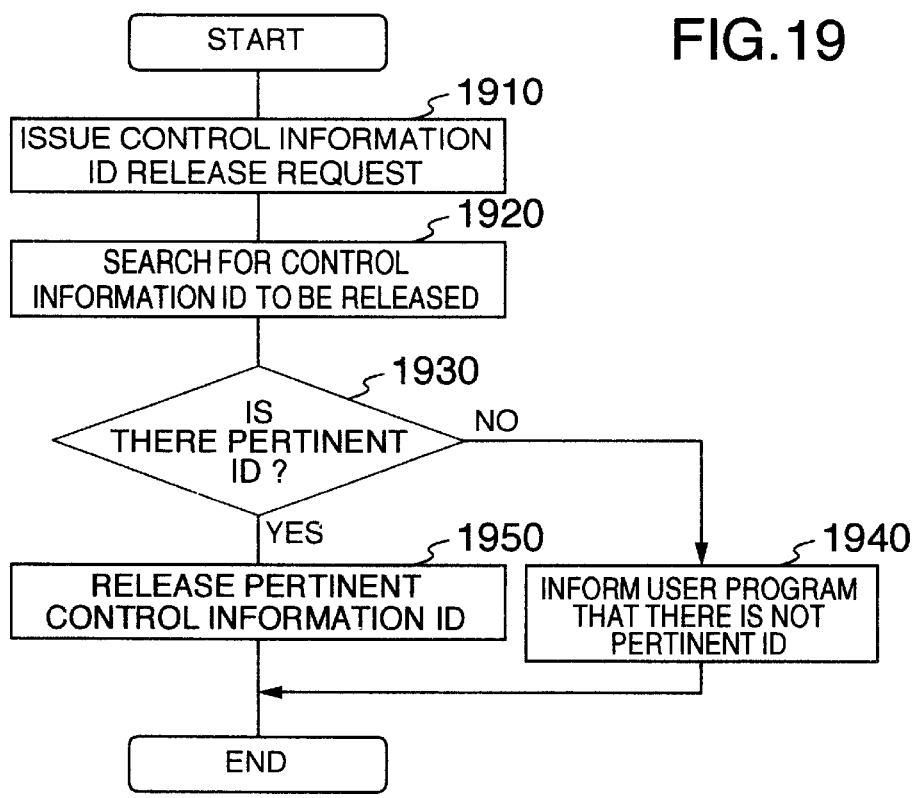
FIG. 19 is a flow chart showing the processing procedure of control information ID release request processing of the third embodiment.

FIG. 19 is a flow chart showing a processing procedure of control information ID release request processing of the present embodiment. First of all, at step 1910, the user program requests the control information manager 1663 of the OS to release a control information ID by specifying the control information ID. Then at step 1920, the control information manager 1663 searches the management table 1770 of the SCSI control information area 1661 for a table of the control information ID requested to be released.

At step 1930, the result of the search is examined, and it is confirmed that the user program which has issued the control information ID release request is the user of that control information ID. This confirmation is conducted by determining whether the process ID of the user program of the calling side coincides with the process ID set in the management table 1770.

If as a result of examining the search result at the step 1930 the control information ID release request has been issued from the proper user program, then the processing proceeds to step 1950. At step 1950, the control information manager 1663 releases the control information ID, and releases the pertinent area of the SCSI control information area 1661 from the virtual space of the user program. At that time, the control information manager 1663 deletes the process ID of the user program and the information indicating that the control information ID is in use from the management table 1770.

If as a result of examining the search result at the step 1930 the control information ID release request has not been issued from the proper user program, then the control information manager 1663 proceeds to step 1940, and informs the user program that there is no pertinent control information ID.

Hereafter, the flow of processing conducted when a user program requests the SCSI adapter 1610 to conduct the transfer processing request of the user data 171 will be described by referring to FIG. 20.

Figure 20:
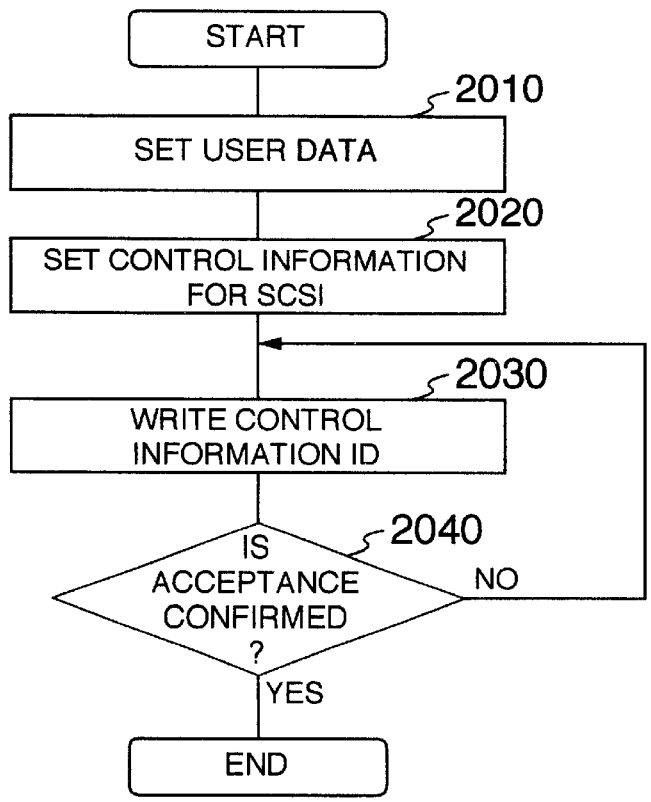
FIG. 20 is a flow chart showing the processing procedure of a transfer processing request of the third embodiment.

FIG. 20 is a flow chart showing the processing procedure of the transfer processing request in the present embodiment. First of all, at step 2010, the user program makes the area storing the user data 171 to be transferred reside on the main memory 150 by using the memory manager 162 of the OS.

Subsequently at step 2020, the user program conducts control information ID request processing to acquire a control information ID from the control information manager 1663, and writes the DMA start address 1720, the DMA length 1730, the header information 1740, and the command 1750 of the user data 171 into a specific area (FIG. 17A) corresponding to the acquired control information ID in the SCSI control information area 1661. The space to be subjected to these kinds of processing is assigned to the user space 170. Users other than the assigned user program do not access that space. Therefore, it is not necessary to conduct the mutual exclusion.

Subsequently at step 2030, the user program issues a single write transaction indicating the control information ID to the SCSI adapter 1610. Writing indicating the control information ID is a single write transaction. Here as well, therefore, it is not necessary to effect the mutual exclusion with respect to other user programs by using the OS.

With respect to this writing indicating the control information ID, the SCSI adapter 1610 writes the acceptance status 1710 into a specific area corresponding to the control information ID in the SCSI control information area 1661.

Subsequently at step 2040, the user program refers to the acceptance status 1710 in the specific area corresponding to the control information ID in the SCSI control information area 1661, and determines whether the acceptance of the above described transmission processing request has succeeded.

If as a result of confirming the acceptance status 1710 at the step 2040 the acceptance has succeeded, processing of the transmission processing request is finished. If the acceptance has failed, then a return to the step 2030 is conducted and thereafter similar processing is repeated. Depending upon the processing procedure of the user program, however, the request processing may be conducted again after other processing has been executed without immediately repeating the request processing again.

The flow of processing of the control information ID buffer 1613 and the command accept decision block 1622 conducted when the SCSI adapter 1610 has accepted the transfer processing request from the user program will now be described by referring to FIG. 21.

Figure 21:
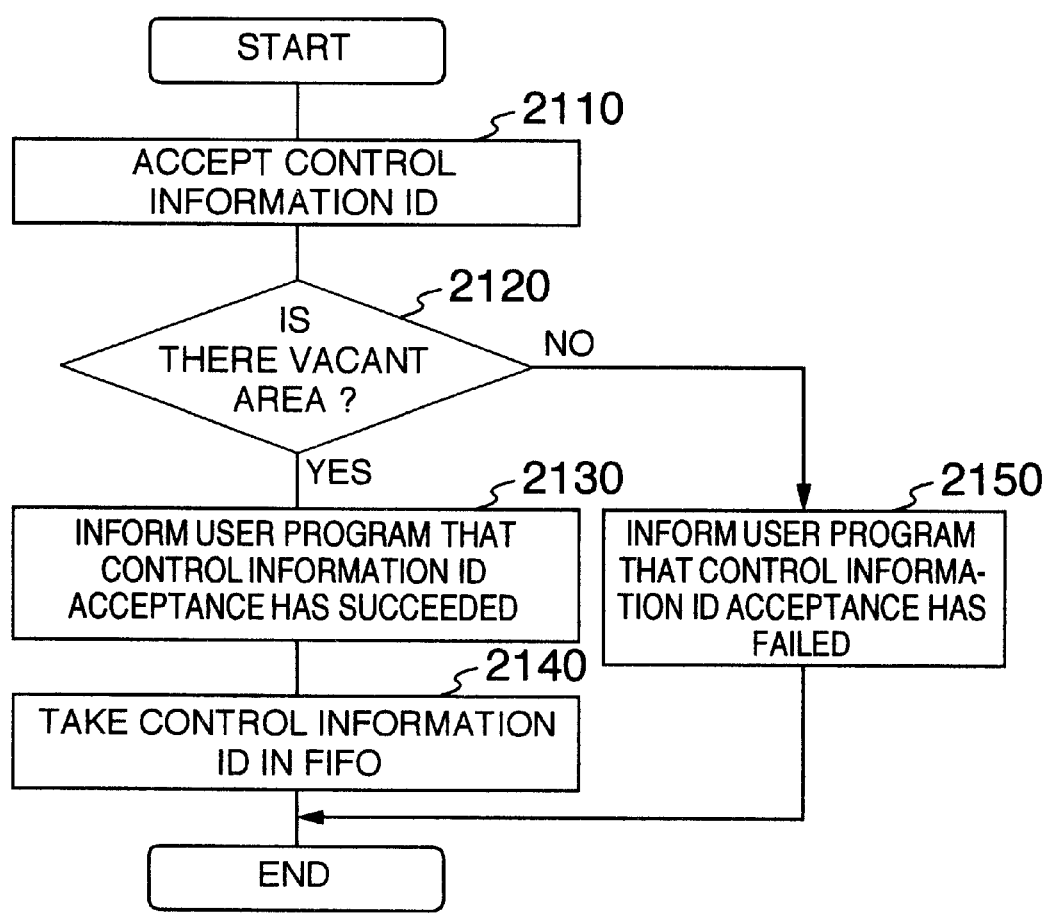
FIG. 21 is a flow chart showing the processing procedure of a command accept decision block 1622 of the second embodiment.

FIG. 21 is a flow chart showing the processing procedure of the command accept decision block 1622 in the present embodiment. First of all, at step 2110, the SCSI adapter 1610 receives a single write transaction indicating the control information ID issued by the user program, in the control information ID buffer 1613.

Subsequently at step 2120, the command accept decision block 1622 of the SCSI adapter 1610 examines the vacancy of the FIFO 1620. If there is a vacant area in the FIFO 1620, the command accept decision block 1622 proceeds to step 2130. If there is not a vacant area, the command accept decision block 1622 proceeds to step 2150.

At step 2130, the command accept decision block 1622 reads out the address information of a specific area in the SCSI control information area 1661 corresponding to the control information ID held in the control information ID buffer 1613 from the SCSI control information address buffer 1612. By using that address information, the command accept decision block 1622 writes "1" into the acceptance status 1710 of the SCSI control information corresponding to the control information ID in the SCSI control information area 1661 as the value of acceptance success. Then the command accept decision block 1622 proceeds to step 2140.

At step 2140, the command accept decision block 1622 accepts the control information ID held in the control information ID buffer 1613, and stores the control information ID in a vacant area of the FIFO 1620.

At step 2150, the command accept decision block 1622 writes "0" into the acceptance status 1710 of the SCSI control information corresponding to the control information ID in the SCSI control information area 1661 as the value of acceptance failure, and finishes the processing.

The flow of processing of the status save block 1621 conducted when the SCSI adapter 1610 has accepted the transfer processing request from the user program will now be described by referring to FIG. 22.

Figure 22:
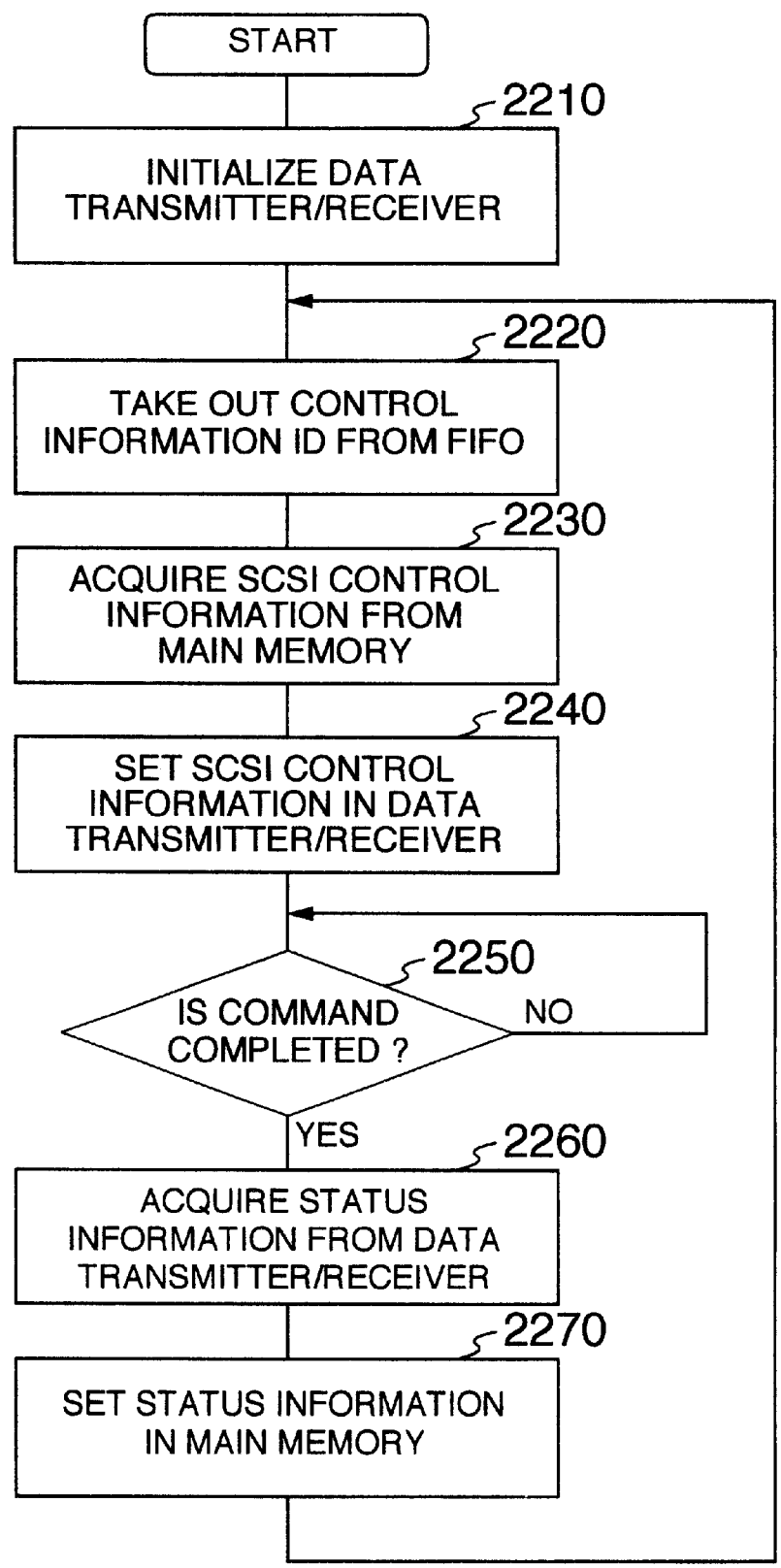
FIG. 22 is a flow chart showing the processing procedure of a status save block 1621 of the third embodiment.

FIG. 22 is a flow chart showing the processing procedure of the status save block 1621 in the present embodiment. First of all, at step 2210, the status save block 1621 initializes the data transmitter/receiver 1611. Subsequently at step 2220, the status save block 1621 takes out the control information ID from the FIFO 1620. If the FIFO 1620 is vacant, then the status save block 1621 waits until a write transaction indicating the control information ID is issued from the user program.

Subsequently at step 2230, the status save block 1621 reads out the address information of the specific area in the SCSI control information area 1661 corresponding to the control information ID taken out from the FIFO 1620, from the SCSI control information address buffer 1612. By using that address information, the status save block 1621 acquires SCSI control information corresponding to the above described control information ID in the SCSI control information area 1661 from the main memory 150.

By the way, the SCSI control information acquired here has the DMA start address 1720, the DMA length 1730, the header information 1740, and the command 1750. In order to conduct the DMA processing from a plurality of areas, however, the SCSI control information may have a plurality of information structures.

Subsequently at step 2240, the status save block 1621 sets the SCSI control information thus acquired in the data transmitter/receiver 1611. At step 2250, the status save block 1621 waits for completion of the processing.

In the step 2240 and the step 2250 of the resource control apparatus of the present embodiment, an example in which control is effected only once is shown. However, information for effecting a plurality of control tasks may be held as the SCSI control information. In that case, the status save block 1621 operates while interpreting the command 1750 so as to conduct a plurality of control tasks.

Subsequently at step 2260, the status save block 1621 acquires status information at the time of completion of the processing from the data transmitter/receiver 1611. In the case where a plurality of control tasks are conducted, it is necessary to keep each record of status information of each control.

Finally at step 2270, the status save block 1621 sets the above described acquired status information in the status 1760 of the SCSI control information corresponding to the control information ID in the SCSI control information area 1661 of the main memory 150, and repeats the processing of the step 2220 and subsequent steps.

In the resource control apparatus of the present embodiment, a processing request to a resource is accepted by a single write transaction and that processing request is executed as heretofore described. Without the mutual exclusion, therefore, it is possible to access the resource from a plurality of programs.

What is claimed is:

1. A method of controlling a computer for controlling a resource connected to the computer, said control method comprising the steps of:

storing control information in an OS space of a main memory, said control information indicating an access between a certain program of a plurality of programs and said resource shared by said plurality of programs;

storing a control information ID indicating an area of said OS space storing said control information in said resource connected between said main memory and a network; and taking out said control information from said OS space, by using said control information ID stored in said resource to execute said access between said certain program and said resource.

2. A control method according to claim 1, further comprising the step of informing via said bus, that said adapter runs short of a storage area, when said adapter runs short of a storage area.

3. A control method according to claim 2, comprising the step of controlling said resource by using said control information taken out.

4. A control method according to claim 1, comprising the step of controlling said resource by using said control information taken out.

5. A control method according to claim 1, wherein said resource comprises a network for connecting another computer to said computer.

6. A control method according to claim 1, wherein said resource comprises a device connected to said computer.

7. A computer for controlling a resource, said computer comprising:

a storage area in an OS space provided in a main memory to store control information indicating an access to a storage area in said main memory dedicated to access between a certain program of a plurality of programs and said resource shared by said plurality of programs;

a bus connected to said main memory; and said resource including an adapter connected to said main memory via said bus, said adapter taking out said control information from storage area in said main memory included in said OS space by using a control information ID.

8. A computer according to claim 7, wherein when said adapter runs short of a storage area, information indicating that said adapter runs short of a storage area is conveyed via said bus.

9. A computer according to claim 8, wherein said resource is controlled by using said control information taken out.

10. A computer according to claim 7, wherein said resource is controlled by using said control information taken out.

11. A computer according to claim 7, wherein said resource comprises a network for connecting another computer to said computer.

12. A computer according to claim 7, wherein said resource comprises a device connected to said computer.

13. A computer control method for controlling a resource, said control method comprising the steps of:

storing control information for conducting processing with respect to the resource in relation to a program of a plurality of programs in a certain area in a control information area, and holding a control information ID indicating the area storing said control information in a control information ID buffer by single writing;

storing the control information ID held in the control information ID buffer in a vacant area of a FIFO for storing a plurality of control information IDs in the resource shared by said plurality of programs, and acquiring the control information of the area corresponding to the control information of the area corresponding to the control information ID stored in said FIFO from the control information area and conducting said processing.

14. A computer control method according to claim 13, comprising the step of storing information indicating an acceptance result of said processing in the area corresponding to said control information ID in the control information area, according to whether there is a vacant area in said FIFO.

15. A computer control method according to claim 13, comprising, after said step of acquiring the control information of the area corresponding to the control information ID stored in said FIFO from the control information area and conducting said processing, the step of storing information indicating a result of the processing in an area corresponding to said control information ID in the control information area.

16. A computer for controlling a resource, said computer comprising:

a control information ID buffer for holding a control information ID indicating a specific area of a control information area storing the control information for conducting a processing for a program of a plurality of programs in the resource shared by said plurality of programs, by single writing;

a FIFO for storing a plurality of control information IDs;

a decision block for storing the control information ID held in said control information ID buffer in a vacant area of said FIFO; a status save block for acquiring the control information of the area corresponding to the control information ID stored in said FIFO from the control information area, and conducting said processing.

17. A computer according to claim 16, wherein said decision block stores information indicating an acceptance result of said processing in the area corresponding to said control information ID in the control information area, according to whether there is a vacant area in said FIFO.

18. A computer according to claim 16, wherein said status save block acquires the control information of the area corresponding to the control information ID from the control information area and conducting said processing, and thereafter stores information indicating a result of the processing in an area corresponding to said control information ID in the control information area.

* * * * *